US010974317B2

(12) United States Patent
Ruxanda et al.

(10) Patent No.: US 10,974,317 B2
(45) Date of Patent: Apr. 13, 2021

(54) CONTROLLED-DISPERSION OF SOLID LUBRICIOUS PARTICLES IN A METALLIC ALLOY MATRIX

(71) Applicant: Emerson Climate Technologies, Inc., Sidney, OH (US)

(72) Inventors: Roxana E. L. Ruxanda, Troy, OH (US); Marc J. Scancarello, Troy, OH (US); Christopher S. Rice, Golden, CO (US); Kenneth P. Young, Denver, CO (US)

(73) Assignee: Emerson Climate Technologies, Inc., Sidney, OH (US)

( * ) Notice: Subject to any disclaimer, the term of this patent is extended or adjusted under 35 U.S.C. 154(b) by 416 days.

(21) Appl. No.: 15/652,980

(22) Filed: Jul. 18, 2017

(65) Prior Publication Data
US 2018/0021850 A1    Jan. 25, 2018

Related U.S. Application Data

(60) Provisional application No. 62/365,756, filed on Jul. 22, 2016.

(51) Int. Cl.
    *B22D 17/04*      (2006.01)
    *F16C 17/26*      (2006.01)
    *F16C 33/10*      (2006.01)

(52) U.S. Cl.
    CPC .............. *B22D 17/04* (2013.01); *F16C 17/26* (2013.01); *F16C 33/1095* (2013.01); *F16C 2220/02* (2013.01); *F16C 2362/52* (2013.01)

(58) Field of Classification Search
None
See application file for complete search history.

(56) References Cited

U.S. PATENT DOCUMENTS

| | | | |
|---|---|---|---|
| 5,200,003 A | 4/1993 | Rohatgi | |
| 6,022,009 A | 2/2000 | Hill | |
| (Continued) | | | |

FOREIGN PATENT DOCUMENTS

| | | |
|---|---|---|
| CN | 1262334 A | 8/2000 |
| CN | 102181705 A | 9/2011 |
| CN | 104963866 A | 10/2015 |
| CN | 105586503 A | 5/2016 |
| CN | 105705793 A | 6/2016 |
| CN | 207494519 U | 6/2018 |

OTHER PUBLICATIONS

First Office Action for Chinese Patent Application No. 201710606943.2 dated Dec. 7, 2018 and English language translation provided by Unitalen Attorneys at Law, 19 pages.

(Continued)

*Primary Examiner* — Ronak C Patel
(74) *Attorney, Agent, or Firm* — Harness, Dickey & Pierce, P.L.C.

(57) ABSTRACT

Methods for making a tribological bearing wear surface for a compressor component are provided. Such methods involve semi-solid metal casting, where an admixture of solid lubricant particles and a metal alloy material is heated to melt the metal alloy material, while the lubricant particles remain in a solid phase. The alloy material and solid lubricant have substantially different densities. The metal alloy material may be a copper, iron, or aluminum alloy, for example. The method further comprises mixing and cooling the admixture to form a semi-solid slurry admixture. Next, the method comprises introducing the semi-solid slurry admixture into a die. Finally, the semi-solid slurry admixture in the die is solidified to form a solid component having the solid lubricant particles homogenously distributed within a metal alloy material matrix, thus forming a metal matrix composite. Compressor components made from such methods are also provided.

20 Claims, 12 Drawing Sheets

(56) References Cited

U.S. PATENT DOCUMENTS

| | | | |
|---|---|---|---|
| 6,079,962 A | 6/2000 | Seibel et al. | |
| 6,401,796 B1 | 6/2002 | Seibel et al. | |
| 6,649,265 B1* | 11/2003 | Kawamura | C04B 41/009 |
| | | | 257/E23.006 |
| 7,811,071 B2 | 10/2010 | Fontaine et al. | |
| 8,747,088 B2 | 6/2014 | Elson et al. | |
| 9,885,347 B2 | 2/2018 | Lachey et al. | |
| 2002/0157533 A1* | 10/2002 | Sugiura | F04B 27/0886 |
| | | | 92/70 |
| 2009/0092517 A1 | 4/2009 | Kosaka et al. | |
| 2012/0096988 A1* | 4/2012 | Mukai | C22C 1/05 |
| | | | 75/231 |
| 2015/0184276 A1* | 7/2015 | Saitou | B21B 19/04 |
| | | | 427/449 |

OTHER PUBLICATIONS

Kim et al. Tribological Properties of Centrifugally Cast Copper Alloy-Graphite Particle Composite. Metallurgical and Materials Transactions. vol. 31A. pp. 1283-1293. (2000).

First Chinese Office Action in corresponding Chinese Application No. 201720901189.0 dated Dec. 25, 2017. Translation provided by Unitalen Attorney at Law.

Brown et al. "Semi-Solid Metal (SSM) Forming of Copper Alloys." Materials Science & Technology. (2005).

Cowie et al. Reducing the Cost of Copper Alloy Parts by Semi-Solid Metal Forming. Die-casting Engineer. vol. 48. pp. 30-41. (2004).

Rohatgi, P.K. Development of Lead-Free Copper Alloy Graphite Castings. The University of Wisconsin-Milwaukee (1996).

* cited by examiner

CONTROLLED-DISPERSION OF SOLID LUBRICIOUS PARTICLES IN A METALLIC ALLOY MATRIX

CROSS-REFERENCE TO RELATED APPLICATIONS

This application claims the benefit of U.S. Provisional Application No. 62/365,756, filed on Jul. 22, 2016. The entire disclosure of the above application is incorporated herein by reference.

FIELD

The present disclosure relates to a semi-solid metal casting process for making bearing materials providing high levels of control over dispersion of solid lubricious particles in a metallic alloy matrix and the bearing materials formed therefrom.

BACKGROUND

Bearings for use in air conditioning and refrigeration compressors used in the heating, ventilation, air conditioning and refrigeration (HVAC&R) industry are unique with regard to required design life as compared to other applications, like automotive air conditioner compressors. Bearings generally serve the purpose of reducing friction at interfacing wear surfaces, while supporting radial and axial loads. Typical compressor life for a residential HVAC&R application is greater than 50,000 hours and in excess of 100,000 hours for HVAC&R commercial applications. By contrast, the typical automotive air conditioner compressor life is about 3,000 hours. Thus, bearings for use in compressors used in HVAC&R applications must be designed for significantly longer lifespans than in other compressor applications. Furthermore, HVAC&R compressors are partially or fully hermetically sealed to prevent refrigerant leakage and assure long, reliable, uninterrupted operation without requiring service. Therefore, oil or bearings are not changed during the entire life of a compressor. Consequently, the durability requirements for such bearings are high. Only carefully designed bearings are capable of such a long life with continuous compressor operation without maintenance or replacement.

In addition, there are potentially inherent lubrication problems with refrigeration and air conditioning compressor bearings. To a large extent, the lubricant oil is chemically and physically miscible with the refrigerant being compressed and circulated through the closed system to provide oil return to the compressor within the refrigeration circuit. This miscibility characteristic, in turn, means that the refrigerant will have a high degree of solvency for the lubricant oil. This may lead to repeated "dry" start-up conditions, after the system has been turned off for some time, because during such off-time the refrigerant may act as a degreasing agent that removes oil from critical bearing surfaces.

Moreover, it is not uncommon during the life of a compressor for repetitive refrigerant flooding situations to happen, particularly during start-up or during system defrosting, thus reducing the effective viscosity of the oil-refrigerant mixture to the point that the bearings become severely stressed. This refrigerant flooding event removes vital lubrication necessary for proper bearing performance. Other phenomena are also typically associated with HVAC&R compressors, such as condensing and boiling repeatedly occurring on various internal surfaces of the compressor due to temperature equilibration between the indoors and outdoors part of such system.

The lubricating properties of a bearing are thus quite important and directly related to the high durability and reliability requirements of refrigeration and air conditioning compressors. These properties are achieved in most bearings in the HVAC&R industry due to the presence of solid lubricious particles that help reduce friction and prevent scuffing and are of particular interest for compressor bearings. In compressors, as well as in other equipment, a cylindrical sleeve-type bearing is commonly used and may include an outer metal sleeve or backer (e.g., formed of steel) having a porous metal layer adjacent to the sleeve with a polymer disposed therein to form the wear surface. For example, a common bearing used as a journal bearing in compressors has a steel sleeve/backer with a porous bronze layer having a well-dispersed PTFE resin, and also having lead particles dispersed in the resin (e.g., through use of a solvent based slurry) throughout the porous bronze layer. In other variations, the sleeve bearing may be cast with lubricant particles, such as lead, dispersed in the metal alloy matrix or may have a bearing layer formed by such a technique.

For cast HVAC&R bearings, ideally the solid lubricious particles should be located at predetermined sites within the solid bearing. Introducing solid lubricious particles into a liquid metallic alloy matrix is not difficult, so long as the densities of the molten metallic alloy matrix and of the solid lubricious particles are relatively comparable. Traditionally, processes of making bearings introduce solid lubricious particles into a 100% liquid phase. For example, lead (Pb) is a particularly efficacious lubricant for bearings and Pb particles have a similar density to many of the alloys that are used as metal alloy matrices. Tightening environmental regulations have restricted use of Pb, further compounding the lubrication issues attendant with compressors in HVAC&R applications. Thus, global mandates to provide lead-free bearings have necessitated development of alternative lead-free designs that provide equivalent and/or improved efficiency to conventional bearings, like sleeve-type bearings.

However, many alternative lead-free solid lubricious particles have a large density difference between them and the base metallic alloy matrix. Such a difference in density poses significant difficulties when forming a bearing material, because the solid lubricious particles will tend to either float or sink in the liquid matrix alloy (depending upon their relative density) in an uncontrolled manner. Therefore, differences in density can produce a non-uniform distribution of the solid lubricious particles within the metallic alloy matrix after solidification, which is highly undesirable for bearings in HVAC&R compressors. It would be desirable to be able to form robust high-performance bearings for use in compressors in HVAC&R, which enables solid lubricious lead-free particles to be uniformly distributed within the metallic alloy matrix in a predetermined and controlled manner.

SUMMARY

This section provides a general summary of the disclosure, and is not a comprehensive disclosure of its full scope or all of its features.

In certain aspects, the present disclosure provides a method of making a bearing wear surface for a compressor component. The method comprises heating an admixture of a plurality of solid lubricant particles and a metal alloy material to melt the metal alloy material. The molten metal alloy material has a first density and the plurality of solid lubricant particles have a second density, wherein a difference between the first density and the second density is greater than or equal to about 25%. In certain aspects, a ratio (X) of the first density ($\rho_1$) of the molten metal alloy to the second density ($\rho_2$) of the solid particles may be less than or equal to about 0.5 or greater than or equal to about 1.5, so that X≤about 0.5 or X≥about 1.5. The metal alloy material is selected from the group consisting of: a copper alloy, an iron alloy, an aluminum alloy, and a magnesium alloy. In certain aspects, the metal alloy material is selected from the group consisting of: a copper alloy, an iron alloy, and an aluminum alloy. In certain preferred aspects, the metal alloy material is a copper alloy. The method further comprises mixing and cooling the admixture, so that the molten metal alloy material cools to form a semi-solid slurry admixture. Next, the method comprises introducing the semi-solid slurry admixture through a die. Finally, the semi-solid slurry admixture is solidified to form a solid component having the solid lubricant particles homogeneously distributed within a matrix of the metal alloy material, where the solid lubricant particles are present along at least one bearing wear surface of the solid component.

In other aspects, the present disclosure provides a compressor component having at least one bearing wear surface comprising a plurality of solid lubricant particles distributed within a matrix of a metal alloy material. The solid lubricant particles may be homogeneously distributed within the matrix in the at least one bearing surface. The solid lubricant particles may be present along the at least one bearing wear surface at greater than or equal to about 10 volume % to less than or equal to about 30 volume %. In certain aspects, the metal alloy material has a first density and the plurality of solid lubricant particles has a second density, wherein a difference between the first density and the second density is greater than or equal to about 25%. In certain aspects, a ratio (X) of the first density ($\rho_1$) of the molten metal alloy to the second density ($\rho_2$) of the solid particles may be less than or equal to about 0.5 or greater than or equal to about 1.5, so that X≤about 0.5 or X≥about 1.5. The metal alloy material is selected from the group consisting of: a copper alloy, an iron alloy, an aluminum alloy, and a magnesium alloy. In certain aspects, the metal alloy material is selected from the group consisting of: a copper alloy, an iron alloy, and an aluminum alloy. In certain preferred aspects, the metal alloy material is a copper alloy. In certain aspects, the plurality of solid lubricant particles is substantially lead-free. In certain other aspects, the compressor component is also substantially lead-free.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The present disclosure will become more fully understood from the detailed description and the accompanying drawings, wherein:

FIG. 3 is shown at a magnification level or scale of 100 µm;

Figures 4A, 4B:
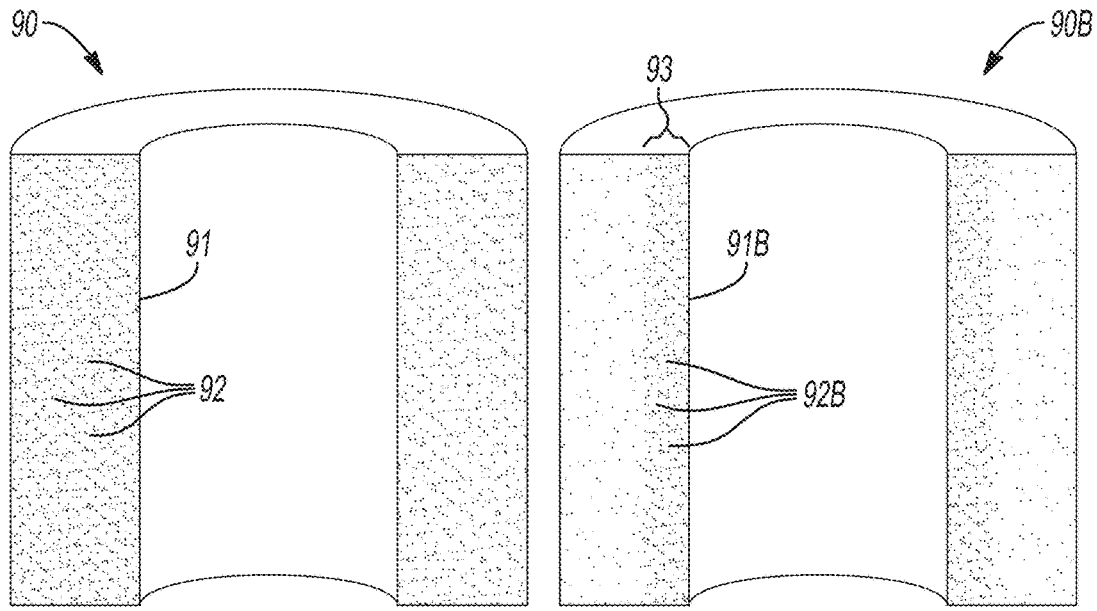
Figures 5A, 5B:
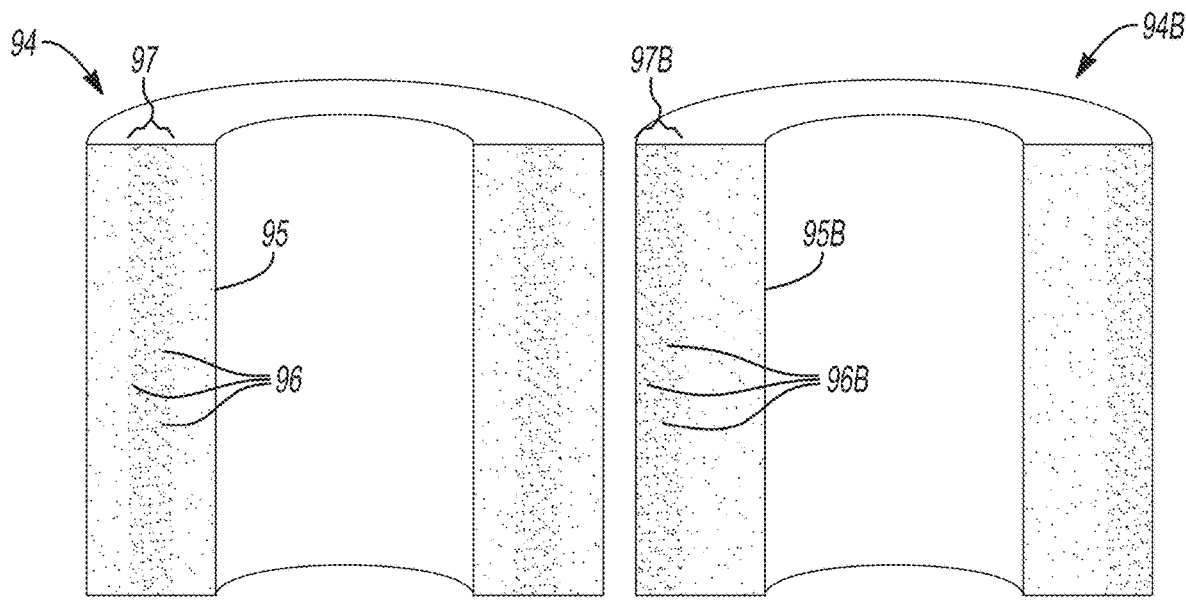
Figure 6:
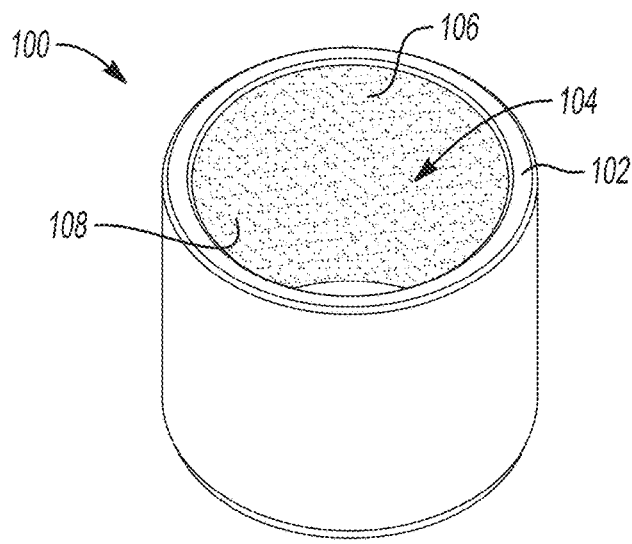
Figure 7:
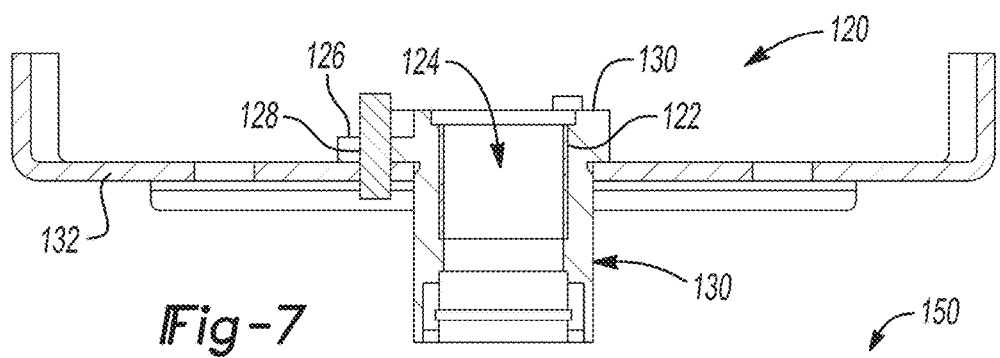
Figure 8:
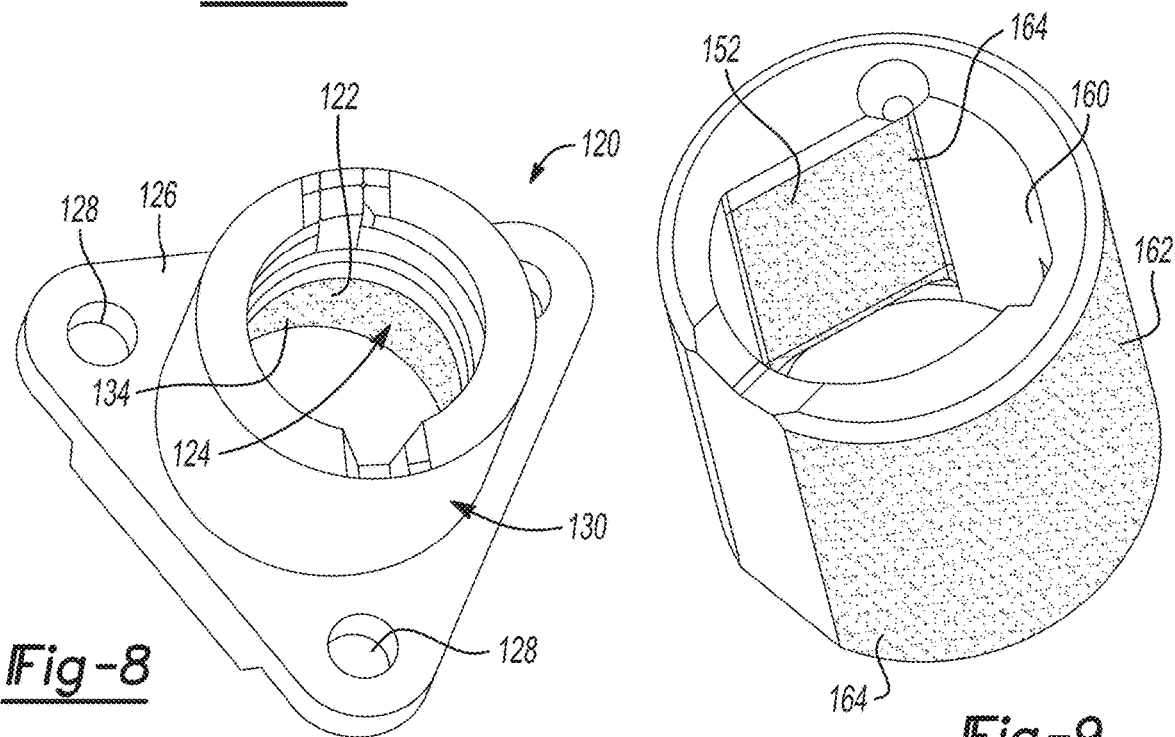
Figure 9:
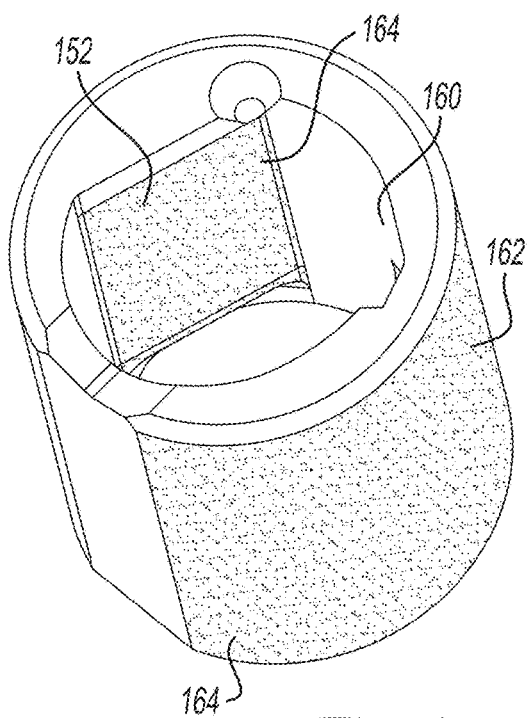
Figure 10A:
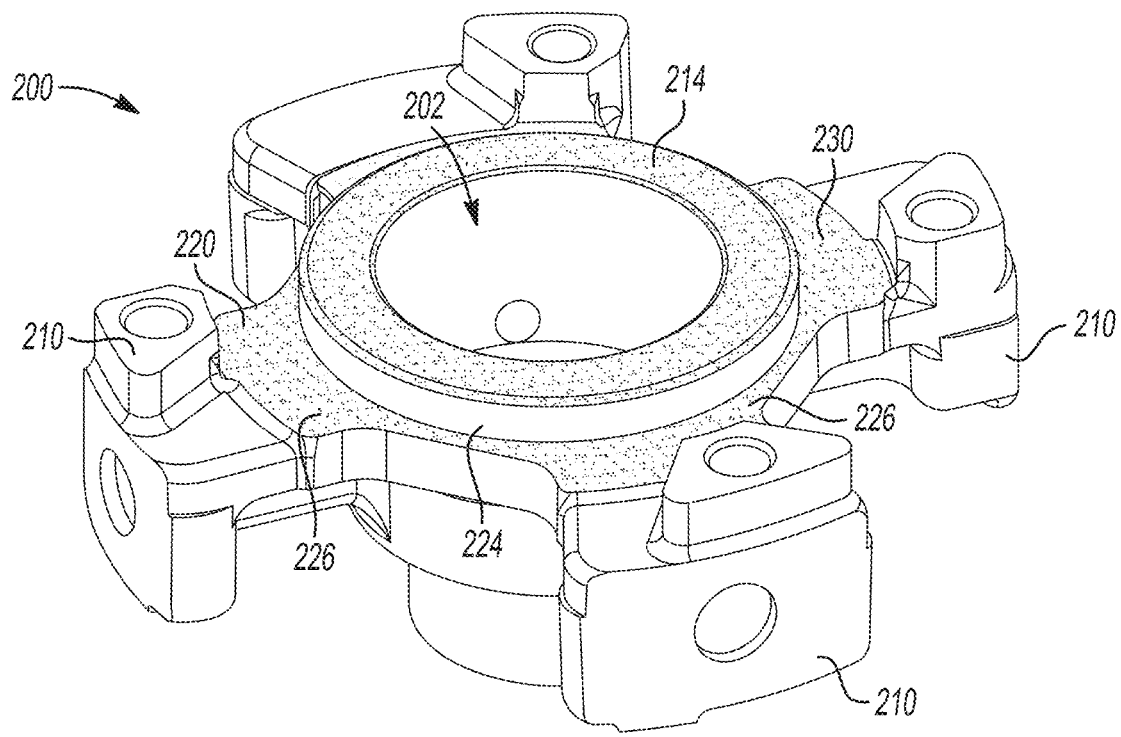
Figure 10B:
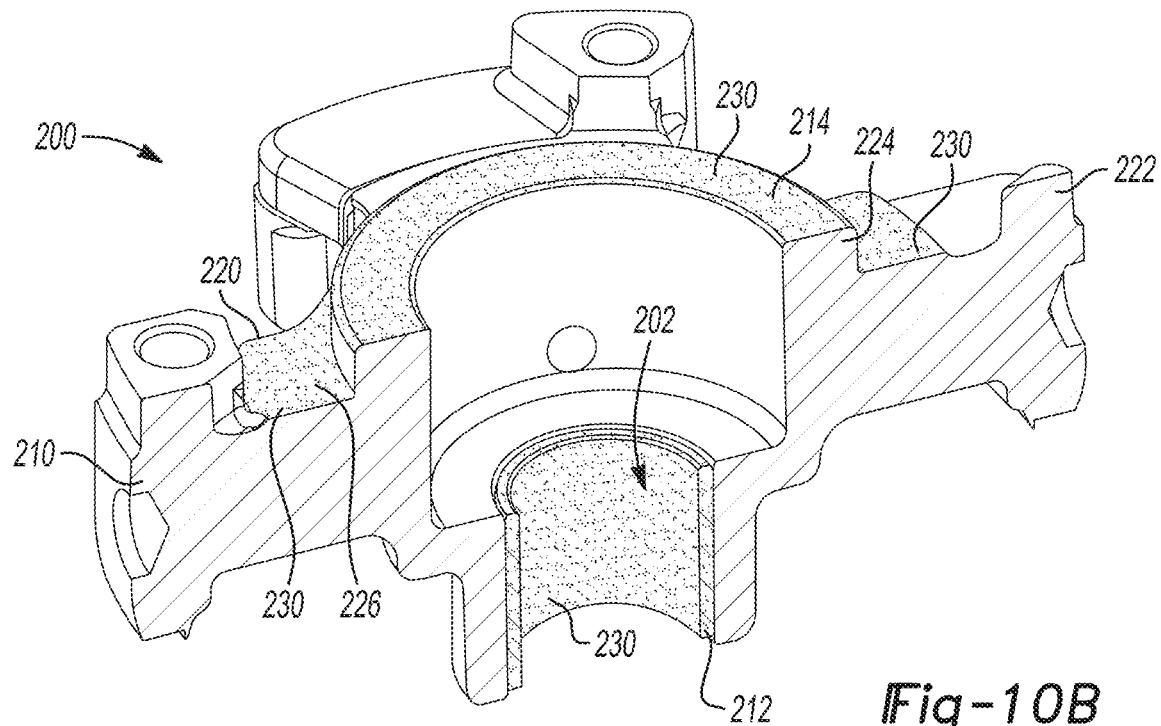

FIGS. 4A-4B are schematic sectional views of an exemplary sleeve journal bearing having a tribological anti-wear composition in the form of a metal matrix composite comprising a plurality of solid lubricant particles dispersed in a porous metal matrix prepared by semi-solid metal casting in accordance with certain principles of the present disclosure. FIG. 4A shows a sleeve journal bearing where the solid lubricant particles are homogeneously distributed throughout the bulk of metal matrix material, including along an exposed inner bearing wear surface, in accordance with certain aspects of the present disclosure. FIG. 4B shows a sleeve journal bearing where an exposed inner bearing wear surface has concentrated solid lubricant particles that are homogeneously distributed throughout the porous metal matrix material in a surface layer in accordance with certain other aspects of the present disclosure;

FIGS. 5A-5B are schematic sectional views of comparative sleeve journal bearings that do not have adequate anti-wear properties on along an exposed inner bearing wear surface. In FIG. 5A, a plurality of solid lubricant particles is unacceptably concentrated in the center of the bulk of a porous metal matrix material, rather than along the exposed inner bearing surface to provide adequate tribological properties. FIG. 5B shows a sleeve journal bearing where a plurality of solid lubricant particles is unacceptably highly concentrated on an external surface of the sleeve journal bearing, while having an unacceptably low concentration of solid lubricant particles along an exposed inner bearing wear surface;

FIG. 6 shows an exemplary self-lubricating sleeve journal bearing for use in compressor machines, such as a scroll compressor, having a bearing surface formed of a tribological anti-wear composition comprising a plurality of solid lubricant particles dispersed in a metal matrix prepared according to certain aspects of the present disclosure;

FIG. 7 is a partial sectional view showing a lower bearing assembly prepared in accordance with certain principles of the present disclosure;

FIG. 8 is a perspective view of one embodiment of a lower bearing prepared in accordance with certain principles of the present disclosure for use in the lower bearing assembly in FIG. 7, where a surface of the lower bearing is formed of a tribological anti-wear composition comprising a plurality of solid lubricant particles dispersed in a metal matrix prepared according to certain aspects of the present disclosure;

FIG. 9 is a perspective view of a drive bushing for a scroll compressor prepared in accordance with certain principles of the present disclosure having bearing surfaces formed of a tribological anti-wear composition comprising a plurality of solid lubricant particles dispersed in a metal matrix prepared according to certain aspects of the present disclosure;

FIGS. 10A-10B show a main bearing housing for a scroll compressor.

Figure 11A:
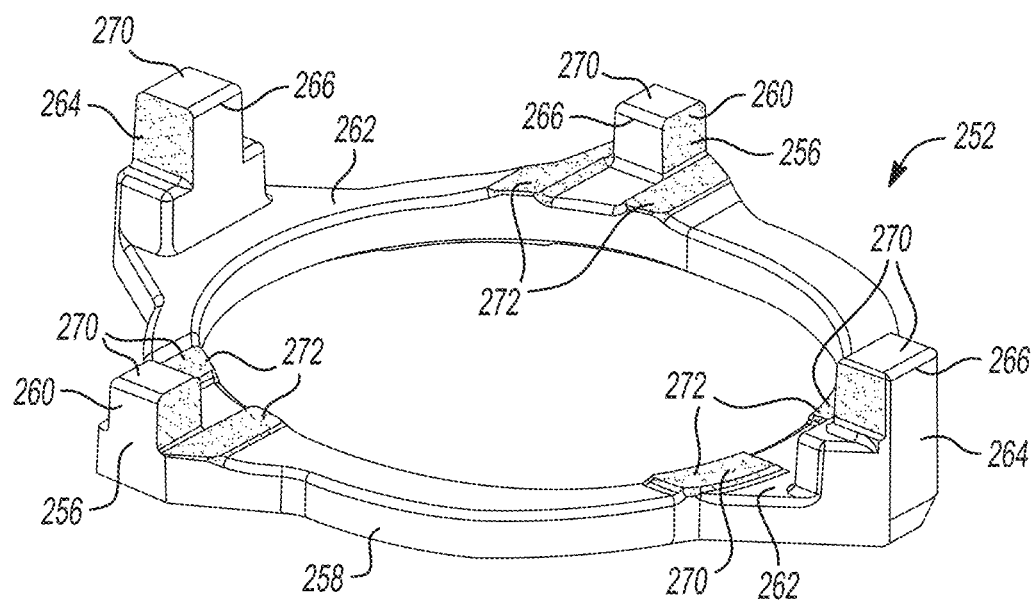
Figure 11B:
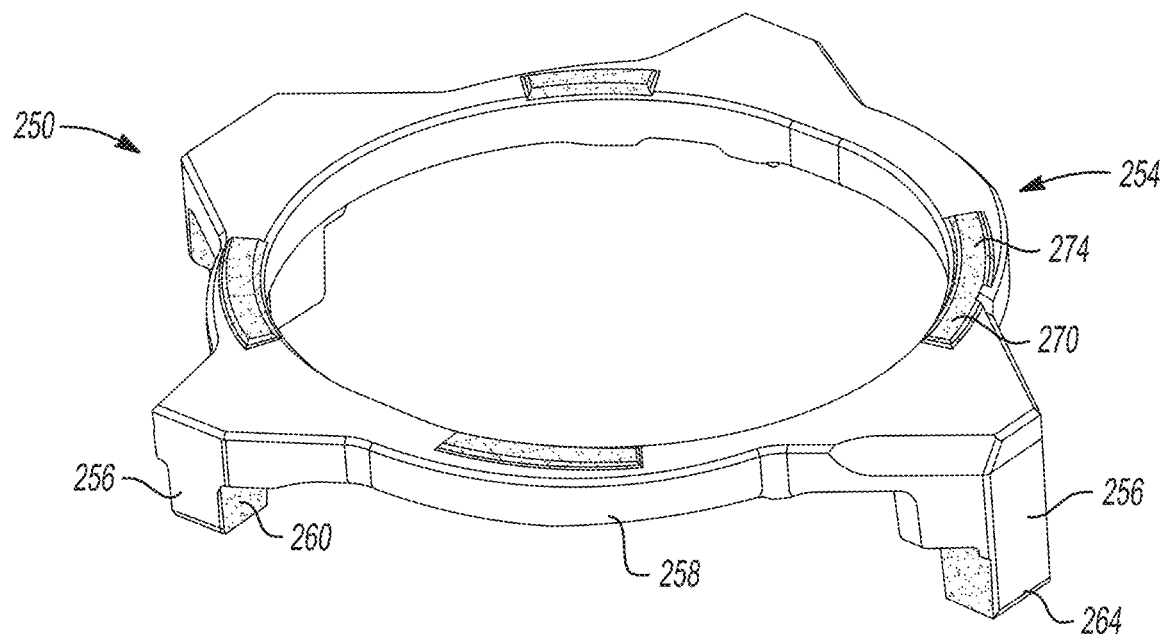

FIG. 10A is a perspective view of a main bearing housing having a bearing surface for interfacing with an Oldham coupling ring formed of a tribological anti-wear composition comprising a plurality of solid lubricant particles dispersed in a metal matrix prepared according to certain principles of the present disclosure. FIG. 10B is a cross-sectional view of the main bearing housing of FIG. 10A;

FIGS. 11A-11B show an Oldham coupling for a scroll compressor.

Figure 12A:
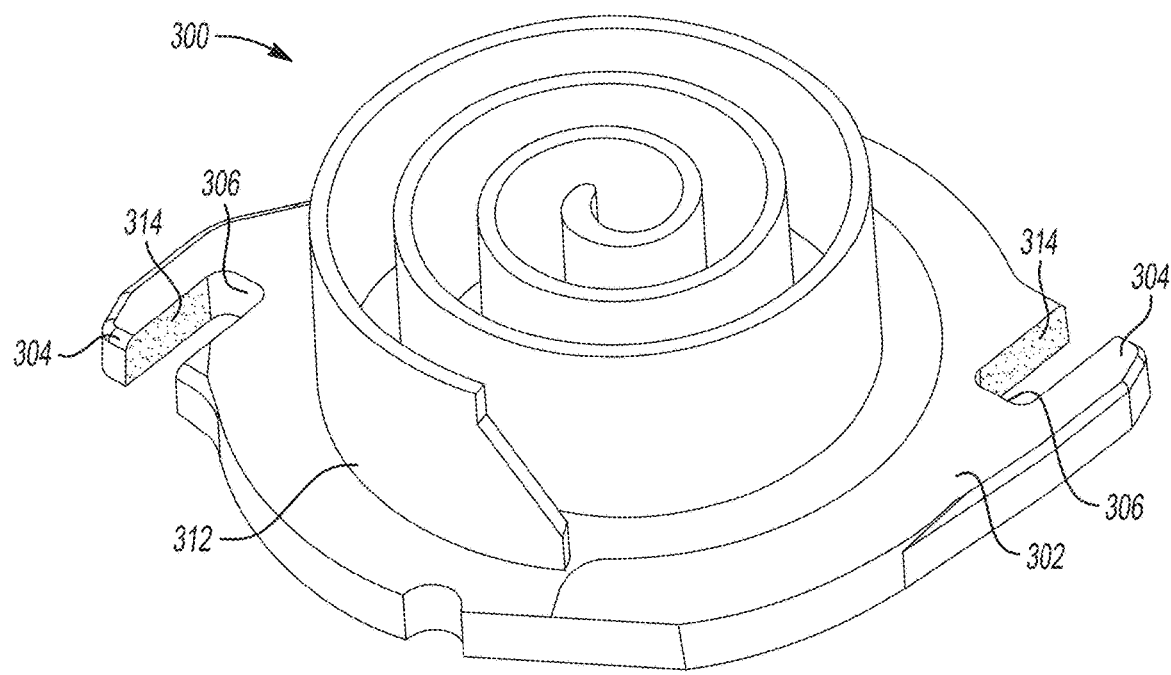
Figure 12B:
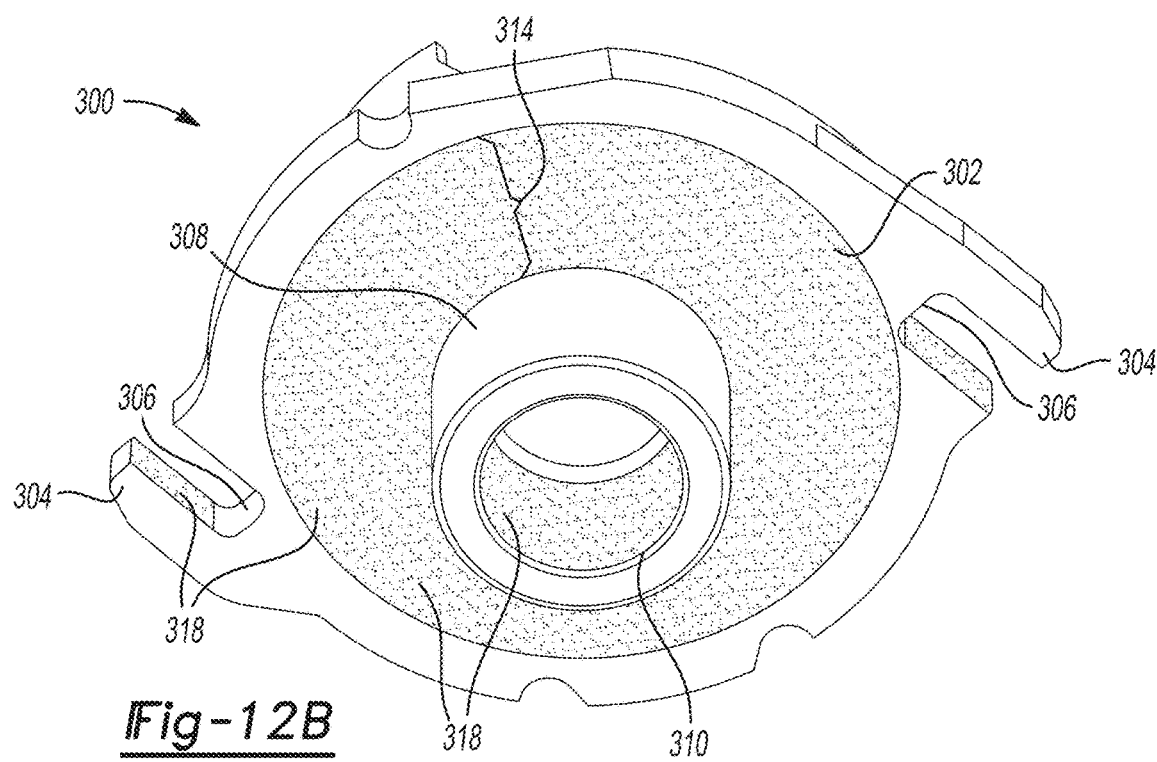
Figure 13:
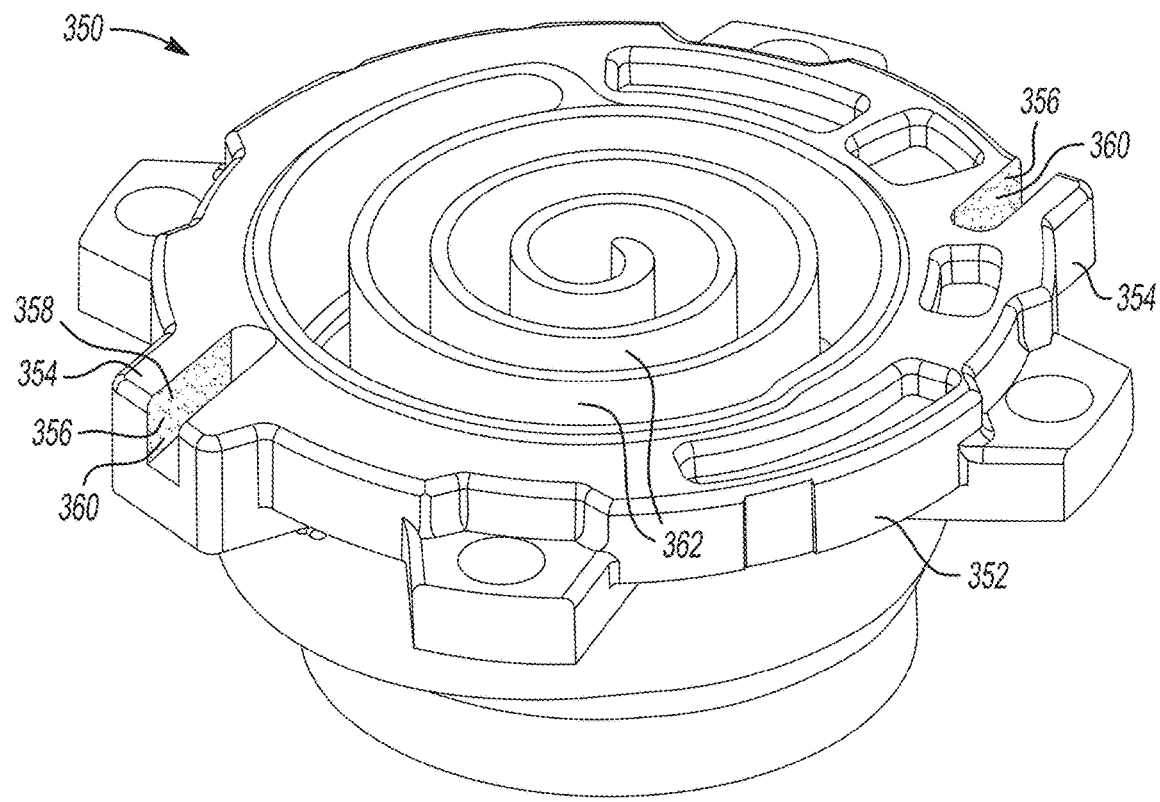
Figure 14:
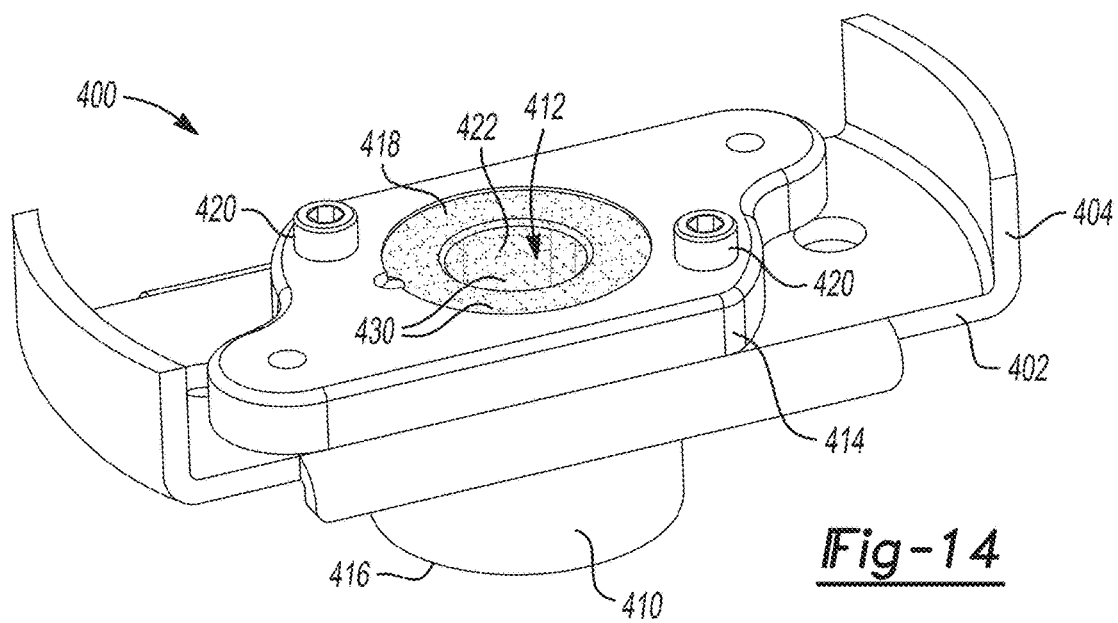
Figure 15:
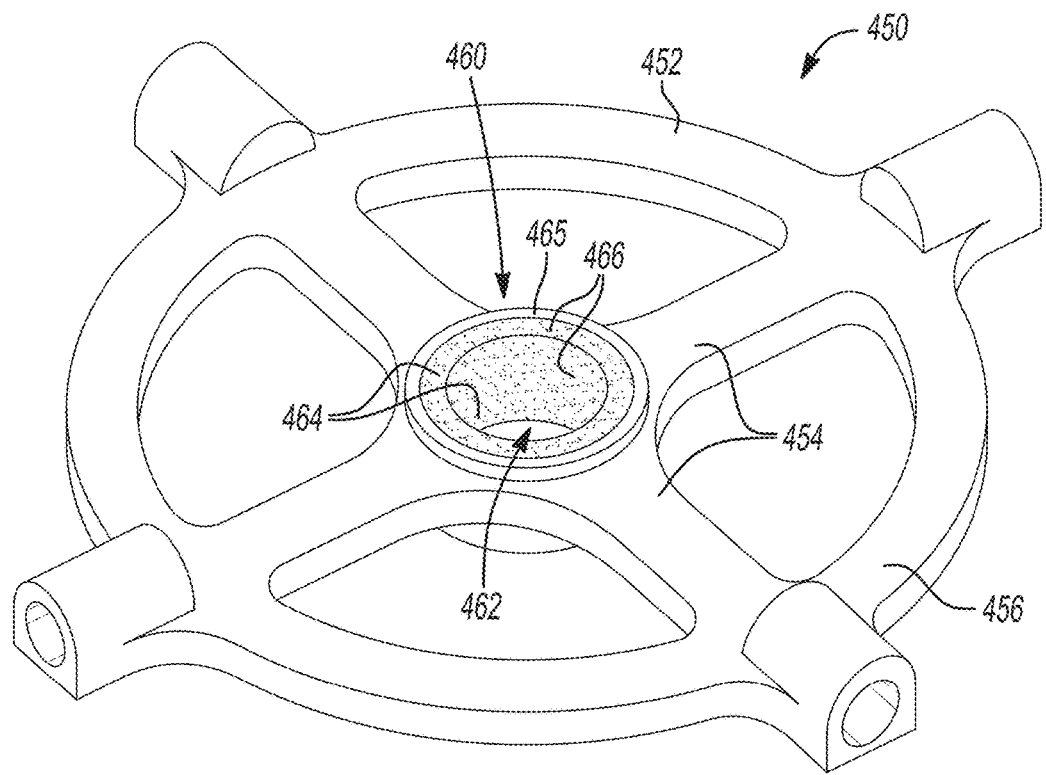
Figure 16:
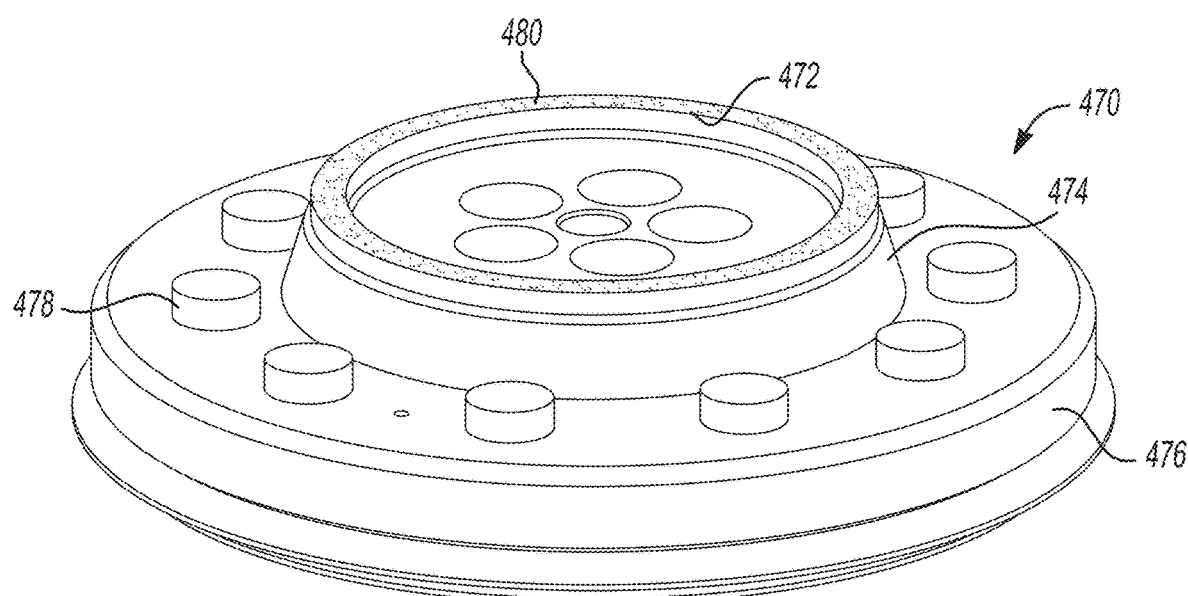
Figure 17:
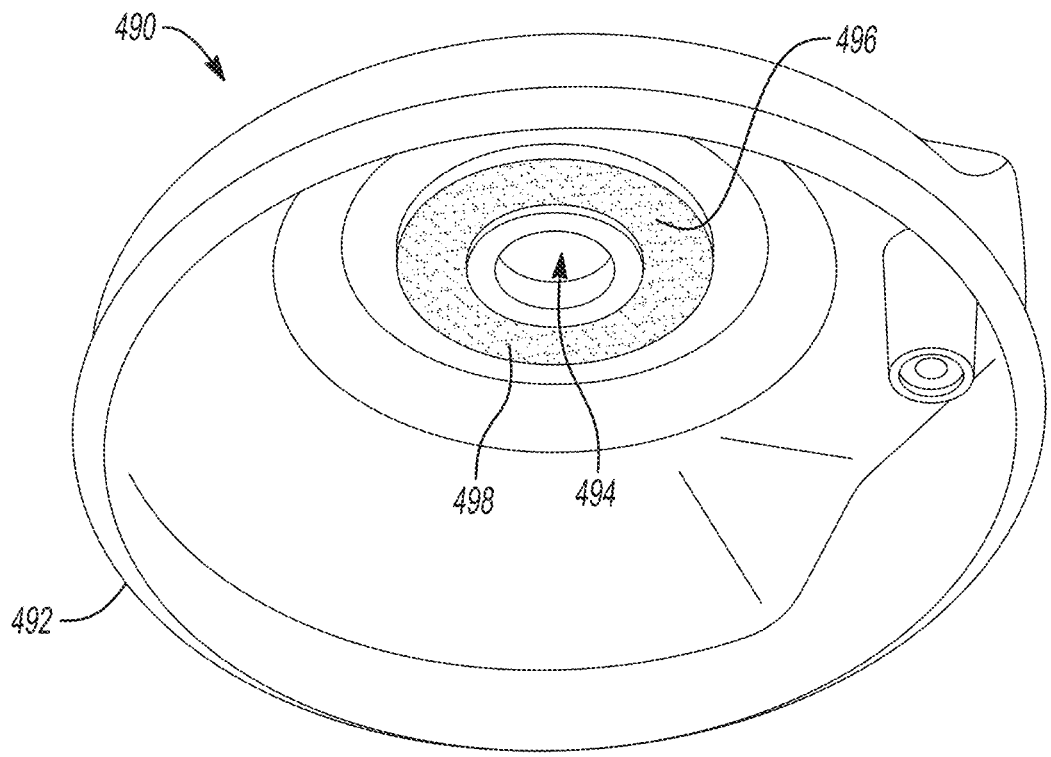

FIG. 11A is a perspective view of an Oldham coupling ring from a first side having bearing wear surfaces formed of a tribological anti-wear composition comprising a plurality of solid lubricant particles dispersed in a metal matrix prepared in accordance with certain principles of the present disclosure. FIG. 11B is a perspective view from a second side opposite to the first side shown in FIG. 11A prepared in accordance with certain principles of the present disclosure, also having wear surfaces formed of the tribological anti-wear composition according to certain aspects of the present disclosure;

FIGS. 12A-12B show an orbiting scroll component for a scroll compressor. FIG. 12A is a perspective view of a first side of the orbiting scroll component for a scroll compressor having exposed bearing wear surfaces. FIG. 12B is a perspective view showing a second side opposite to the first side of the orbiting scroll component of FIG. 12A also having exposed bearing wear surfaces. The bearing wear surfaces are formed of a tribological anti-wear composition comprising a plurality of solid lubricant particles dispersed in a metal matrix prepared in accordance with certain principles of the present disclosure;

FIG. 13 is a perspective view of a fixed non-orbiting scroll component for a scroll compressor having bearing surfaces formed of a tribological anti-wear composition comprising a plurality of solid lubricant particles dispersed in a metal matrix prepared according to certain aspects of the present disclosure;

FIG. 14 is a perspective view of another embodiment of a lower bearing for use in a scroll compressor, where the lower bearing has bearing surfaces formed of a tribological anti-wear composition comprising a plurality of solid lubricant particles dispersed in a metal matrix prepared in accordance with certain principles of the present disclosure;

FIG. 15 is a perspective view of yet another alternative embodiment of a lower bearing for use in a scroll compressor, where the lower bearing has bearing surfaces formed of a tribological anti-wear composition comprising a plurality of solid lubricant particles dispersed in a metal matrix prepared in accordance with certain aspects of the present disclosure;

FIG. 16 is a perspective view of an upper seal plate of a floating seal assembly for use in a scroll compressor, where the upper seal plate has at least one wear surface formed of a tribological anti-wear composition comprising a plurality of solid lubricant particles dispersed in a metal matrix prepared in accordance with certain principles of the present disclosure;

FIG. 17 shows a muffler plate or cap for a scroll compressor having a bearing surface formed of a tribological anti-wear composition comprising a plurality of solid lubricant particles dispersed in a metal matrix prepared according to certain aspects of the present disclosure.

Figure 18B:
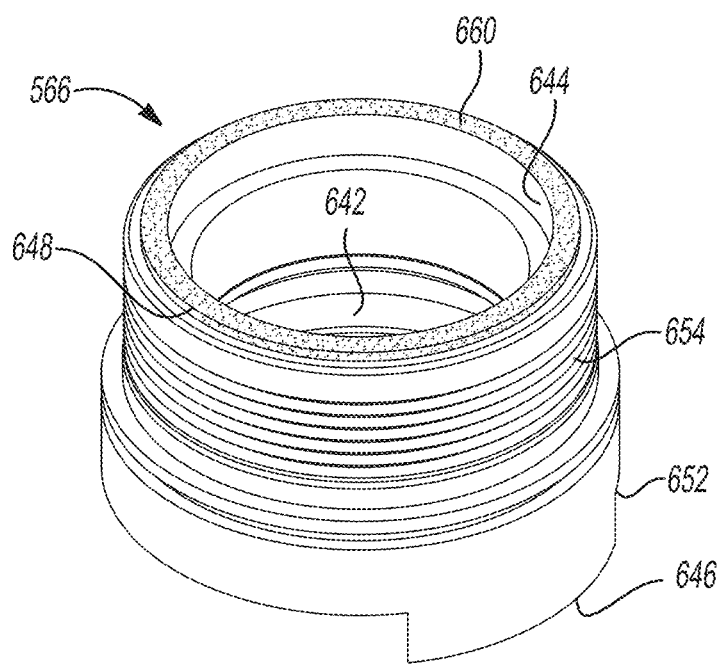
Figure 18A:
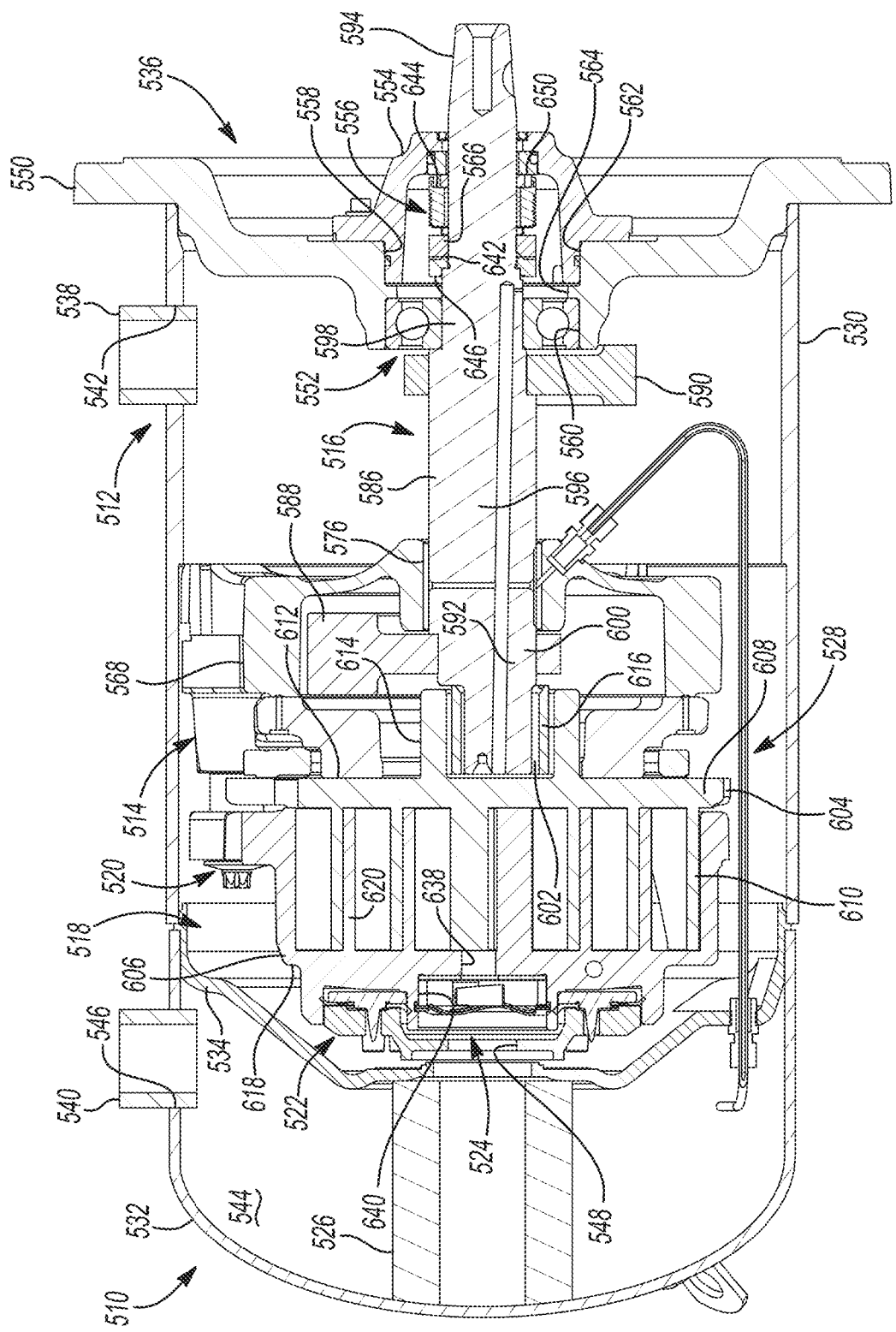
Figure 19A:
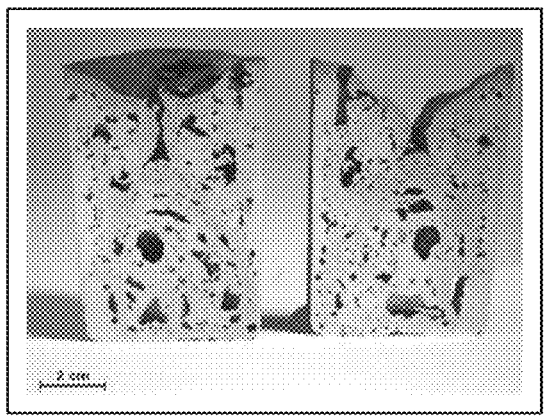
Figure 19B:
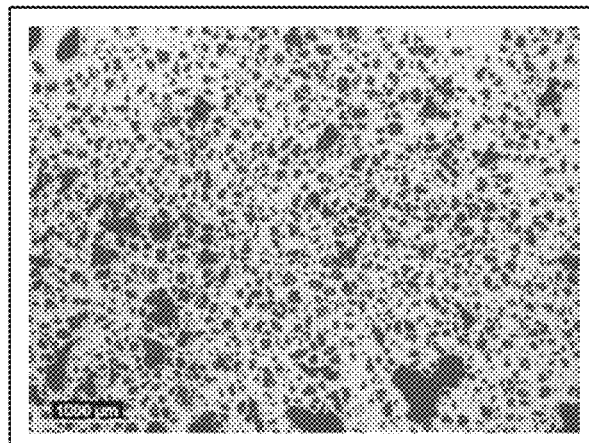
Figure 19C:
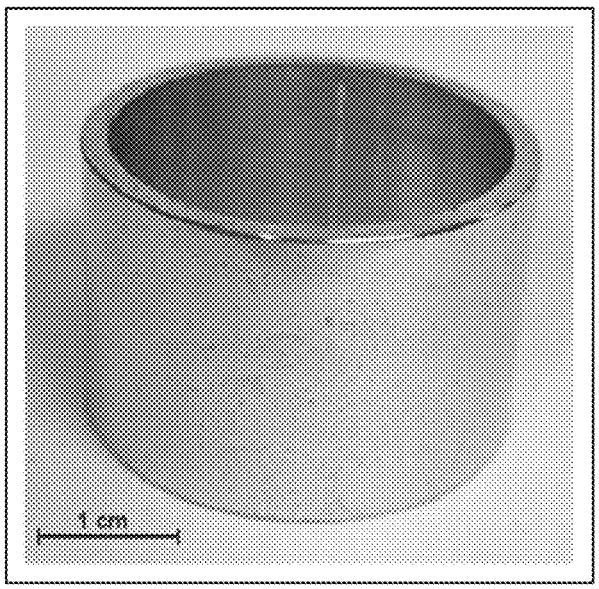
Figure 19D:
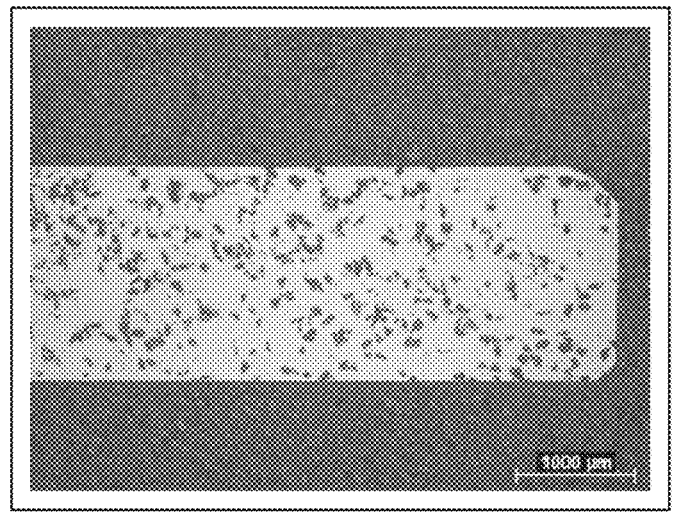

FIGS. 18A-18B show a horizontal open-drive scroll compressor having a bellows-type shaft seal assembly including a bearing surface formed of a tribological anti-wear composition comprising a plurality of solid lubricant particles dispersed in a metal matrix prepared according to certain aspects of the present disclosure. FIG. 18A is a sectional view of a horizontal open-drive scroll compressor according to certain aspects of the present disclosure. FIG. 18B is a perspective view of the bellows-type shaft seal assembly having the bearing surface formed of the tribological anti-wear composition comprising the plurality of solid lubricant particles dispersed in a metal matrix for use in the horizontal open-drive scroll compressor of FIG. 18A;

FIGS. 19A-19D show images of an unetched microstructure from an admixture produced prior to injection into a mold for semi-solid casting and microstructures after semi-solid casting according to certain aspects of the present disclosure. FIGS. 19A-19B show the unetched microstructure from an admixture produced prior to injection into the mold. FIG. 19A shows the admixture with a scale of 2 cm and FIG. 19B shows the same unetched admixture magnified to a scale of 1,000 µm. FIGS. 19C-19D show a microstructure of a cylindrical sleeve bearing after semi-solid casting in accordance with certain aspects of the present disclosure. FIG. 19C shows the cylindrical bearing sleeve with a scale bar of 1 cm and FIG. 19D shows the magnified cylindrical bearing sleeve (scale bar of 1,000 µm).

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of" any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated.

All percentages used herein are by mass or weight, unless otherwise indicated.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Figure 1:
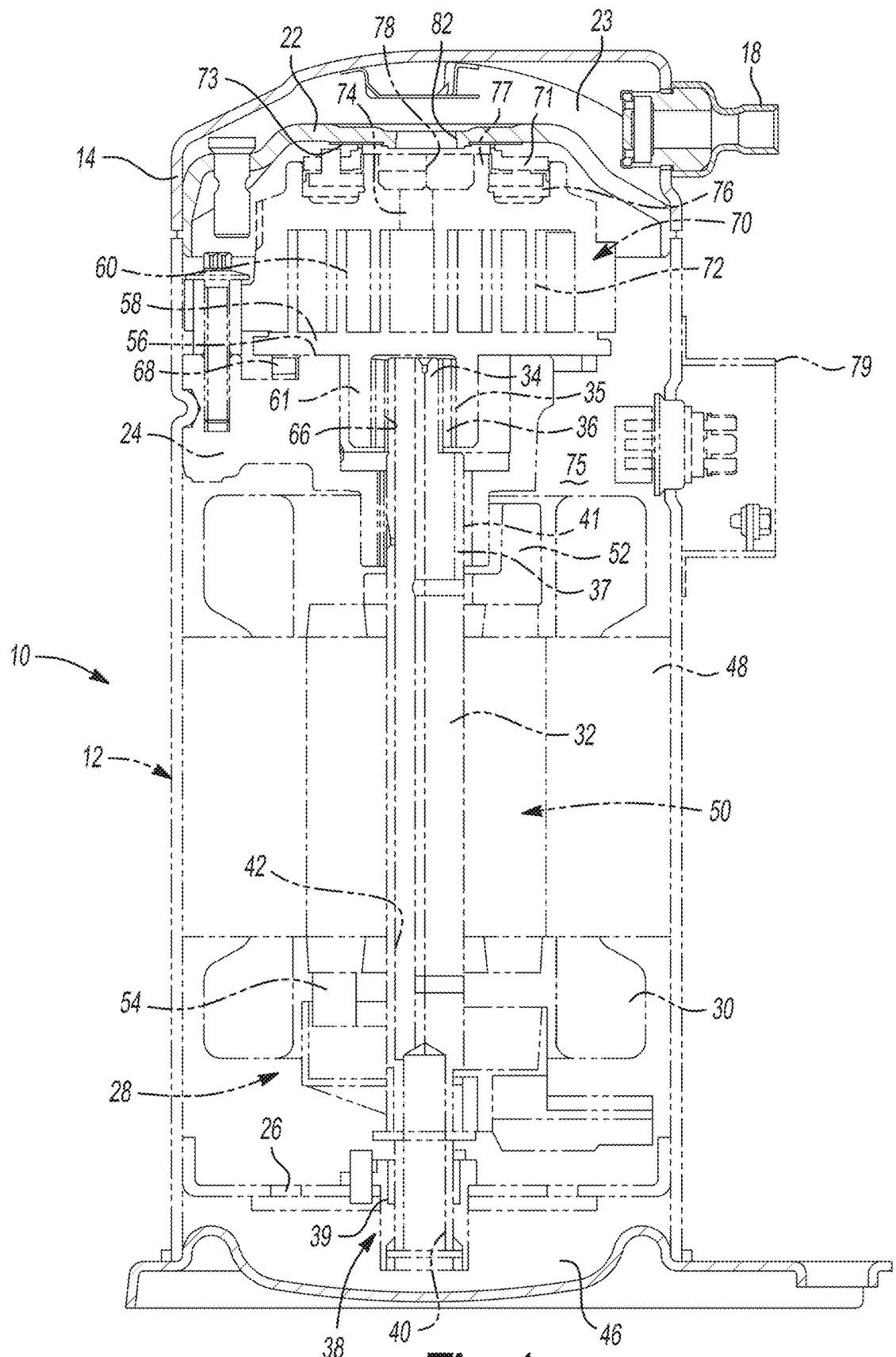
FIG. 1 is a sectional view through a center of a scroll compressor.

The present disclosure relates to processes for making bearing wear surfaces for a compressor component. A bearing, bearing surface, or wear surface is one that occurs at an interface between two or more surfaces that are in relative motion with respect to one another. Compressor components having such bearing surfaces may be used in a compressor or another element in a refrigeration and/or heating, ventilation, and air conditioning (HVAC) device. An exemplary compressor is a scroll compressor 10 as depicted in FIG. 1. While the scroll compressor 10 is used as the primary example in the present disclosure, it is understood that these teachings are applicable to other types of compressors (e.g., reciprocating compressors). Further, the principles of the present disclosure also pertain to other mechanical or electromechanical devices, including wear surfaces in engines, pumps, and other devices, including those related to heating, ventilation, and air conditioning (HVAC) systems, refrigeration systems, and other systems.

FIG. 1 shows a conventional refrigerant scroll compressor 10 that includes a generally cylindrical hermetic shell 12 having a cap 14 welded at the upper end thereof. Cap 14 is provided with a refrigerant discharge 18, which may have the usual discharge valve therein. Other major elements affixed to the shell include a compressor inlet 79 having a fitting (not shown); a transversely extending partition or muffler cap 22 which is welded about its periphery at the same point that cap 14 is welded to shell 12. A discharge chamber 23 is defined by cap 14 and partition or muffler cap 22.

A motor 28, including a motor stator 30, is disposed between the main bearing housing 24 and lower bearing support 26. A drive or crankshaft 32 (an alternative embodiment of which is shown in detail in FIG. 5) has an eccentric crank pin 34 at the upper end thereof and is rotatably journaled in an upper bearing 35. The upper bearing 35 can include a conventional drive bushing 36 adjacent to (e.g., press-fitted therein). Thus, a cylindrical hub 61 of an orbiting scroll 58 receives the eccentric crank pin 34 and the upper bearing 35. The crankshaft 32 is also supported by and rotatably journaled in a lower bearing assembly 38 that is part of lower bearing support 26. In a central region of the scroll compressor 10, the crankshaft 32 passes through and rotates within an aperture 41 of main bearing housing 24, which may include a cylindrical main bearing member 37 disposed within aperture 41.

The main bearing housing 24 and lower bearing support 26 each define radially outwardly extending legs, which are each secured to the shell 12. The upper surface of the main bearing housing 24 is provided with a flat thrust bearing surface 56 on which is disposed the orbiting scroll 58 having a spiral wrap or vane 60 extending therefrom. Projecting downwardly from the lower surface of orbiting scroll 58 is the cylindrical hub 61. The upper bearing 35 is a self-lubricating sleeve type bearing that receives the drive bushing 36 therein. The cylindrical hub 61, upper bearing 35 and drive bushing 36 each define a concentric inner bore 66, in which crank pin 34 of crankshaft 32 is drivingly disposed.

Non-orbiting scroll 70 is provided having a spiral wrap or vane 72 positioned in meshing engagement with the orbiting spiral vane 60 of orbiting scroll 58. Non-orbiting scroll 70 has a centrally disposed discharge passage 74 defined by a base plate portion communicating with an upward opening 82 which is in fluid communication with the muffler discharge chamber 23 defined by cap 14 and partition or muffler cap 22. Non-orbiting scroll 70 also includes an annular hub or raised shoulder portion 77 which surrounds the discharge passage 74. An annular recess 76 is also formed in non-orbiting scroll 70 within which is disposed a floating seal assembly 71.

An intake compartment 75 is in fluid communication with compressor inlet 79 through which the fluids (e.g., refrigerant) to be compressed within the intermeshed spiral vanes 60, 72 are introduced. After the fluid passes through intake compartment 75, it is compressed in the spiral vanes 60, 72, so that the pressurized fluid is then released through the discharge passage 74. A reed valve assembly 78 or other known valve assembly is provided in the discharge passage 74 to regulate flow from the discharge passage 74 to through opening 82 and into discharge chamber 23.

The floating seal assembly 71 is supported by the annular recess 76 of non-orbiting scroll 70 and engages a seat portion 73 mounted to the partition or muffler cap 22 for sealingly dividing intake compartment 75 from discharge chamber 23. Recess 76 and floating seal assembly 71 cooperate to define an axial pressure biasing chamber which receives pressurized fluid being compressed by spiral vanes 60 and 72 so as to exert an axial biasing force on non-orbiting scroll 70 to thereby urge the tips of respective spiral vanes 60, 72 into sealing engagement with the opposed baseplate surfaces.

The lower portion of the interior of shell 12 defines an oil sump 46 which is filled with lubricating oil. Bore 40 acts as a pump to force lubricating fluid up the crankshaft 32 and into bore 42 and ultimately to all of the various portions of the compressor which require lubrication. Crankshaft 32 is rotatably driven by electric motor 28 including motor stator 30, windings 48 passing there through, and a motor rotor 50 press fitted on crankshaft 32 and having upper and lower counterweights 52 and 54, respectively.

An Oldham coupling 68 is disposed between orbiting scroll 58 and main bearing housing 24. The Oldham coupling 68 is keyed to orbiting scroll 58 and non-orbiting scroll 70 and thus prevents rotational movement of orbiting scroll 58.

In certain aspects, the present disclosure provides methods of making a bearing wear surface for a compressor, such as a bearing surface on a compressor component. Such a method uses a semi-solid casting process to form a metal matrix alloy or a metal matrix composite material. A metal matrix composite has a base metal material that serves as a metal alloy matrix within which solid lubricious particles are distributed.

By way of background, casting is a manufacturing process where a molten metal alloy is poured into a hollow casting mold, where it solidifies after cooling, to essentially form a solidified cast part having a desired shape in a near-finished state. Conventional casting is when this process takes places gravitationally. Die casting is another casting technique that uses specialized devices to force molten metal under pressure into or through a metallic die.

Semi-solid metal casting (SSM) is a near net shape variant of die casting that combines the advantages of casting and forging. SSM is typically done at a temperature where the metal is between its liquidus temperature and solidus temperature. In certain aspects, the metal is approximately 30% to about 65% solid phase with the balance melted liquid phase, as it passes into a die. In certain aspects, SSM is conducted at high pressures. The metal has a relatively low viscosity to be usable, and to reach this low viscosity, the material typically requires a globular primary phase surrounded by the liquid phase. Viscosity of the metal can be a complex variable in SSM and depends upon several parameters, including but not limited to a % of solids, temperatures, and shear rate. SSM is mostly used for high-end castings made from aluminum, copper, and magnesium alloys.

Generally, the present disclosure contemplates introducing one or more solid lubricants into a semi-solid alloy slurry having a density and viscosity that prevents flotation or sinking of the solid lubricant. The semi-solid state helps to entrap and hold the particles, which in certain variations are uniformly suspended, as they are dispersed in the material that forms the bearing. Furthermore, semi-solid casting occurs at lower temperatures than traditional casting processes, so it provides the ability for bearings to contain lubricant particles that would not normally survive the melting temperatures of traditional casting methods. Furthermore, because the temperatures in semi-solid casting are lower, it can help to retain metal coatings on metal-coated particles during the production process, as where during traditional casting the metal coating may melt and be removed at the higher temperatures.

In one aspect, the present disclosure provides a method of making a bearing wear surface for a compressor that comprises heating an admixture of a plurality of solid lubricant particles and a metal alloy material to partially melt the metal alloy material. The plurality of solid lubricant particles may be of a single composition or in alternative aspects may be multiple distinct particle compositions. As noted above, the present teachings pertain to processes that enable even distribution of a plurality of solid lubricant particles in a metal alloy material where there is a large difference in density levels of the particles and the metal alloy material.

The partially molten metal alloy material has a first density ($\rho_1$) and the plurality of solid lubricant particles has a second density ($\rho_2$). The first density may be greater than or less than the second density, so that the solid lubricant particles may float or sink in the metal alloy material. For example, the first density may differ from the second density by at least about 25% ((($\rho_1-\rho_2$)/$\rho_1$)×100 or ((($\rho_2-\rho_1$)/$\rho_2$)× 100)). The difference between the first density and the second density may be greater than or equal to about 25%, optionally greater than or equal to about 50%, greater than or equal to about 100%, greater than or equal to about 200%, greater than or equal to about 300%, greater than or equal to about 350%, by way of example.

By way of example, the density of C905 copper alloy at room temperature is about 8.72 g/cm$^3$ and the calculated density in the literature of bronze bearings (comprising copper and tin) in a liquid state is about 7.92 g/cm³. Molten aluminum has a density ranging from about 2.6 g/cm³ to about 2.8 g/cm³, so approximately 2.7 g/cm³ on average. Molten magnesium has a density of about 1.74 g/cm³. The density of cast iron alloys typically range from greater than or equal to about 6.8 g/cm³ to less than or equal to about 7.8 g/cm³, while steel has an approximate density of 7.85 g/cm³ and stainless steel from greater than or equal to about 7.48 g/cm³ to less than or equal to about 8 g/cm³. Uncoated graphite has a density of about 2.09 to about 2.23 g/cm³ (an average density value of about 2.16 g/cm³). The density of nickel-coated graphite (e.g., 75 wt. % nickel-coated graphite is about 3.19 g/cm³, where the nickel coating is assumed not to melt, but rather to remain solid or diffuse into the metal matrix during stages 2 and 3; so the graphite particles remain unaffected).

In certain other aspects, a ratio of the first density ($\rho_1$) of the molten metal alloy to the second density ($\rho_2$) of the solid particles may be less than or equal to about 0.5 (a ratio density ($\rho_1:\rho_2$) of about 1:2). In other aspects, a ratio of the first density ($\rho_1$) of the molten metal alloy to the second density ($\rho_2$) of the solid particles may be greater than or equal to about 1.5 (a ratio density ($\rho_1\rho_2$) of about 3:2). Thus, a ratio (X) of the first density ($\rho_1$) of the molten metal alloy to the second density ($\rho_2$) of the solid particles may be less than or equal to about 0.5 (X≤about 0.5) or greater than or equal to about 1.5 (X≥about 1.5).

For example, the ratio of the first density to the second density may be less than or equal to about 0.5, optionally less than or equal to about 0.4, optionally less than or equal to about 0.3, optionally less than or equal to about 0.2, optionally less than or equal to about 0.1 or alternatively greater than or equal to about 1.5, optionally greater than or equal to about 1.6, optionally greater than or equal to about 1.7, optionally greater than or equal to about 1.8, optionally greater than or equal to about 1.9, optionally greater than or equal to about 2, optionally greater than or equal to about 2.25, optionally greater than or equal to about 2.5, optionally greater than or equal to about 2.75, optionally greater than or equal to about 3, and in certain aspects, optionally greater than or equal to about 3.5. In one non-limiting example, a ratio of bronze alloy (Cu—Sn) density to particle density (nickel-coated graphite) is about 2.7 (a ratio of 27:10 or about 270% difference in density) in a solid state and about 2.48 (a ratio of 248:100 or about 248%) in liquid state.

As noted above, in certain variations, the heating of the admixture of solid lubricant particles and metal alloy material is conducted so that the admixture has a predetermined solids content, for example, greater than or equal to about 30% to less than or equal to about 65% solid phase with the balance liquid phase, so that the semi-solid alloy slurry can be processed in the semi-solid casting process while substantially preventing flotation or sinking of the solid lubricant within the semi-solid alloy slurry (to maintain even distribution therein). Thus, the heating of the admixture can be to a temperature between the metal alloy's liquidus temperature and solidus temperature.

Next, the method includes mixing and cooling the admixture, so that the molten metal alloy material cools to form a semi-solid slurry admixture. In certain aspects, the mixing ensures that the solid lubricant particles remain substantially homogenously or evenly distributed therein. In certain variations, greater than or equal to about 5% volume fraction of solids (and less than or equal to about 95% by volume fraction of liquids) is needed in the semi-solid slurry admixture prior to casting and in certain variations, optionally greater than or equal to about 20% fraction of solids (and less than or equal to about 90% by volume fraction of liquids), and in certain aspects, optionally greater than or equal to about 30% solids to less than or equal to about 65% solids.

The semi-solid slurry admixture is then passed into or through a die. Such a process may be conducted under high pressure, for example, a final intensified nominal injection pressure may be greater than or equal to about 14,500 psi (about 100 MPa) to less than or equal to about 15,500 (about 107 MPa), for example, nominally about 15,000 psi (about 103 MPa). Such injection pressures are particularly suitable where the molten metal alloy is a copper alloy. The semi-solid slurry admixture is then solidified to form a solid component having the solid lubricant particles distributed within a matrix of the metal alloy material. The plurality of solid lubricant particles is present along at least one bearing wear surface of the solid component. In certain aspects, the solid lubricant particles are homogeneously or evenly distributed within the metal alloy matrix material along the bearing wear surface. The plurality of solid lubricant particles may thus be homogeneously distributed throughout the at least one bearing wear surface, but not necessarily throughout the entire compressor component. In certain other preferred aspects, the solid lubricant particles are homogeneously or evenly distributed throughout the entire metal alloy matrix material of the metal matrix composite throughout the entire compressor component.

In certain aspects, the solid lubricant particles may be present at greater than or equal to about 10 volume % to less than or equal to about 30 volume % of a total volume of the semi-solid admixture, for example, at greater than or equal to about 17 volume % to less than or equal to about 25 volume %, optionally at greater than or equal to about 18 volume % to less than or equal to about 22 volume %, and optionally at about 20 volume %. In certain aspects, the solid lubricant particles are present along at least one bearing wear surface of the solid component at greater than or equal to about 15 volume % to less than or equal to about 30 volume % of a total volume of the semi-solid admixture.

The solid lubricant particles are preferably substantially lead-free. The term "substantially free" as referred to herein is intended to mean that the compound or species is absent to the extent that undesirable and/or detrimental effects are negligible or nonexistent. For example, a lead-free component may comply with lead-free industry requirements, such as RoHS, which allows a maximum 1000 ppm lead (maximum of 0.1% Pb) to be considered lead-free. In certain aspects, "substantially free" of lead means the material comprises less than or equal to about 0.1% by weight, optionally less than or equal to about 0.01% by weight, and in certain preferred aspects, 0% by weight of the undesired lead species.

In certain variations, the solid lubricant particles may comprise graphite particles. In certain variations, the solid lubricant particles may comprise metal-coated graphite particles. For example, the metal-coated particles may be nickel-coated graphite particles, copper-coated graphite particles, or zinc-coated graphite particles. In certain variations, the metal-coated particles may be nickel-coated or copper-coated graphite particles. In one variation, graphite particles are nickel-coated. The density of nickel-coated graphite (e.g., 75 wt. % nickel-coated graphite) is about 3.19 g/cm³ (where the nickel coating is assumed not to melt, but rather to remain solid or diffuse into the metal matrix during stages 2 and 3s; so the graphite particles remain unaffected). The density of copper-coated graphite (e.g., 60 wt. % copper-coated graphite) ranges from about 2.96 g/cm³ to about 3.01 g/cm³

(where the copper coating is assumed to either melt at the initial value of 2.96 g/cm$^3$ or diffuse at the second value of 3.01 g/cm$^3$) Suitable graphite lubricant particles may have an average particle size distribution in the range of −170 to +325 mesh size, optionally in the range of −100 to +230 mesh size. For −170 +325 mesh: 90% or more of the particulate material will pass through a 170-mesh sieve (particles smaller than 88 μm) and be retained by a 325-mesh sieve (particles larger than 44 μm). For a −100 to +230 mesh: 90% or more of the material will pass through a 100-mesh sieve (particles smaller than 149 μm) and be retained by a 230-mesh sieve (particles larger than 63 μm). In certain variations, coated graphite particles may have a mesh size of −120 to +200 mesh: 73% or more of the material will pass through a 120-mesh sieve (particles smaller than 125 μm) and be retained by a 200-mesh sieve (particles larger than 74 μm).

In other variations, the solid lubricant particles may include metal sulfide particles, such as molybdenum disulfide ($MoS_2$), tungsten disulfide ($WS_2$), and/or zinc sulfide (ZnS). The respective densities of $MoS_2$, $WS_2$, and ZnS (uncoated) are about 5.06 g/cm$^3$, 7.5 g/cm$^3$, and 4.09 g/cm$^3$. The metal sulfide particles may have a minimum average particle diameter or particle size of greater than or equal to about 5 micrometers. In certain aspects, the metal sulfide particles may have a minimum average particle diameter or particle size of greater than or equal to about 5 μm and less than or equal to about 20 μm.

In yet other variations, the solid lubricant particles may include boron nitride particles, such as hexagonal boron nitride particles. The boron nitride particles may be uncoated or metal-coated, for example, including copper-coated boron nitride and nickel-coated boron nitride particles. The uncoated density of boron nitride particles is about 2.1 g/cm$^3$. Metal-coated boron nitride particles would have similar densities to metal-coated graphite particles. Suitable hexagonal boron nitride particles may have an average particle size distribution for at least about 90 weight % in the range of −100 to +325 mesh size (149 μm passing and 44 μm retained), optionally in the range of −100 to 230 mesh size (149 μm passing and 63 μm retained).

Other solid lubricant particles may include carbon fiber particles. The carbon fiber particles may be uncoated or metal-coated, for example, including copper-coated carbon fibers and nickel-coated carbon fibers. The density of uncoated carbon fiber particles ranges from about 1.75 g/cm$^3$ to 2.00 g/cm$^3$. In certain variations, the carbon fibers have a maximum length of less than or equal to about 15 mm and a maximum diameter of less than or equal to about 20 micrometers (μm). Yet other solid lubricant particles may include bismuth (Bi).

The metal alloy material may be a copper alloy, an iron alloy, an aluminum alloy, or a magnesium alloy material. In certain aspects, the metal alloy material is selected from the group consisting of: a copper alloy, an iron alloy, and an aluminum alloy. In certain preferred variations, the metal alloy material is a copper alloy material. A suitable copper alloy matrix material has a composition comprising greater than or equal to 0 to less than or equal to about 10% by weight of tin, greater than or equal to 0 to less than or equal to about 6% by weight of bismuth, greater than or equal to 0 to less than or equal to about 5% by weight of nickel, greater than or equal to 0 to less than or equal to about 15% by weight of aluminum, greater than or equal to 0 to less than or equal to about 5% by weight of iron, greater than or equal to 0 to less than or equal to about 40% by weight of zinc, other minor constituents and elements at less than or equal to about 2%, and a balance copper. Suitable commercially available copper alloys that have such compositions include CDA 905 (also known as C90500 or ASTMB505) and CDA 630.

In certain variations, CDA 905 is particularly advantageous copper alloy for use with the inventive technology and typically has a composition of greater than or equal to about 9% to less than or equal to about 11% by weight of tin, less than or equal to about 1% by weight of nickel, less than or equal to about 0.005% by weight of aluminum, less than or equal to about 0.2% by weight of iron, greater than or equal to 1% to less than or equal to about 3% by weight of zinc, less than or equal to about 0.3% by weight of lead, less than or equal to about 0.2% by weight of antimony, less than or equal to about 0.3% by weight of phosphorus, less than or equal to about 0.05% by weight of sulfur, less than or equal to about 0.005% by weight of silicon, and greater than or equal to 86% to less than or equal to about 89% by weight of copper.

Other copper alloy materials may include aluminum bronzes, which contain copper and tin. Typically, aluminum bronzes may contain greater than or equal to about 9% by weight to less than or equal to about 12% by weight aluminum and less than or equal to about 6% by weight iron and less than or equal to about 6% by weight nickel. Such aluminum bronzes may include Grades UNS C60800 through C64210, and UNS C95200 through C95900. Grade C64200 is an aluminum silicon bronze $CuAl_7Si_2$ that in addition to aluminum at 7% by weight and silicon at about 2% by weight, has less than or equal to about 1% by weight Sn and a remainder Cu.

Other suitable copper alloys include silicon iron bronze C65620, phosphorus bronze C51000, beryllium copper, and copper-silicon alloys (silicon brass). It should be noted that while many copper alloys designated as bronze alloys include both copper and tin, not all copper alloys that are commercially designated bronzes contain tin, rather they may contain other elements like zinc. For example, silicon iron bronze C65620 contains greater than or equal to 1.5% to less than or equal to about 4% by weight of zinc, greater than or equal to 1% to less than or equal to about 2% by weight of iron, about 1% manganese, greater than or equal to 2.4% to less than or equal to about 4% by weight of silicon and a remainder of copper. Phosphorus bronze C51000 has $CuSn_5$ with about 0.2% by weight phosphorus and a remainder copper. Beryllium copper C17200 has a formula of $CuBe_2$, with beryllium at less than or equal to about 2% by weight with a balance of copper. Copper-silicon alloys (silicon brass) may have less than or equal to about 20% by weight zinc and less than or equal to about 6% by weight silicon and include C8700 to C87999. A suitable example includes C87850 having greater than or equal to 74% to less than or equal to about 78% by weight of copper, greater than or equal to 2.7% to less than or equal to about 3.4% by weight of silicon, and a remainder zinc. Other copper alloys known or to be discovered are also contemplated.

In certain variations, the metal alloy may be an iron alloy, such as cast iron, steel, or stainless steel. Such ferrous alloys may have greater than 0% carbon to less than or equal to about 4.2% by weight carbon. Generally, higher amounts of carbon, for example, above about 2% are considered to be a cast iron alloy, while carbon amounts below 2% are steel. In certain variations, iron alloys may also comprise silicon, for example, greater than or equal to about 1 to less than or equal to about 3% by weight silicon in certain alloys. Stainless steel typically includes chromium as an alloying ingredient, which may be present at greater than or equal to about 10.5% by weight. However, chromium may be present at lower levels in mild steel. In addition to the silicon, carbon, and chromium described above, other non-limiting alloying ingredients that can be included in ferrous alloys at appropriate levels known to those of skill in the art include: copper, tin, antimony, manganese, strontium, cerium, yttrium, scandium, neodymium, lanthanum, calcium, barium, titanium, zirconium, nickel, molybdenum, titanium, or any combinations thereof. In certain variations, the amount of each respective alloying ingredient is less than or equal to about 1.5% by weight, optionally less than or equal to about 1% by weight, optionally less than or equal to about 0.75% by weight, optionally less than or equal to about 0.5% by weight, optionally less than or equal to about 0.25% by weight, optionally less than or equal to about 0.1% by weight, and in certain variations, optionally less than or equal to about 0.01% by weight. Inoculants and other additives may be included in such an iron alloy. Other impurities may be present at less than about 0.1% by weight. The balance of such compositions is iron.

In alternative variations, the metal alloy may be an aluminum alloy material having a composition comprising greater than or equal to about 6% to less than or equal to about 12% by weight of silicon, greater than or equal to 0 to less than or equal to about 20% by weight of tin, greater than or equal to 0 to less than or equal to about 5% by weight of zinc, greater than or equal to 0 to less than or equal to about 5% by weight of magnesium, greater than or equal to 0 to less than or equal to about 3% by weight of iron, greater than or equal to 0 to less than or equal to about 1% by weight of manganese, greater than or equal to 0 to less than or equal to about 1% by weight of nickel, other minor constituents and elements at less than or equal to about 2%, and a balance aluminum. Suitable commercially available aluminum alloys that have such compositions include A356 and $Al_{20}Sn_1Cu$.

In yet other alternative variations, the metal alloy may be a magnesium alloy material having a composition comprising greater than or equal to about 3% to less than or equal to about 10% by weight of aluminum, less than or equal to 12% by weight of zinc, less than or equal to about 3% by weight of silicon, less than or equal to about 2% by weight of strontium, less than or equal to about 5% by weight of calcium, less than or equal to about 5% by weight of rare earth metals, other minor constituents and elements at less than or equal to about 2%, and a balance magnesium. Suitable commercially available magnesium alloys that have such compositions include AZ91 and AM60B.

In certain aspects, the metal alloy material is a copper alloy (e.g., CDA 905 copper alloy) material and the plurality of solid lubricant particles comprises graphite particles. In certain preferred aspects, the metal alloy material is a copper alloy (e.g., CDA 905 copper alloy) material and the plurality of solid lubricant particles comprises nickel-coated graphite particles.

In certain aspects, the present disclosure contemplates a semi-solid metal (SSM) casting process that includes the following steps: 1) preheating a copper alloy precursor; 2) adding metal-coated graphite particles to the preheated precursor; 3) reheating/melting the precursor mixture having the solid metal-coated graphite particles dispersed therein to form a semi-solid slurry; 4) stirring the mixture while cooling to form a semi-solid slurry admixture; and 5) injecting the semi-solid slurry admixture into a mold having a cavity with the predetermined shape of the component to be formed.

For the first step of pre-heating the copper alloy precursor, the precursor may be cut or chopped pieces of the copper alloy ingot. A pre-weighed amount of the pieces of copper alloy ingot may be preheated in a graphite crucible using an induction furnace. Pieces are heated from room temperature to approximately 970° C.-990° C. Such a heating process may take for greater than or equal to about 30 seconds to less than or equal to about 3 minutes, for example, about 1 to about 2 minutes. At this temperature, the alloy (C90500/C950) exists in the semi-solid state, meaning that the divided pieces of ingot or precursor generally maintain their solid or semi-solid shape, but are soft. Once at temperature, the furnace is temporarily turned off.

In the second step, the metal-coated graphite particles are added. Nickel-coated graphite is suitable for use in such a process, although uncoated or other metal-coated graphite particles, such as copper-coated graphite or zinc-coated graphite, may be used in alternative embodiments. Preheating of the graphite particles is optional, but when used, preheat is desirably maintained below 400° C. to avoid clumping or particle agglomeration. Pre-weighed, nickel-coated graphite corresponding to about 20-21% by volume of the final mixture is added to the preheated copper alloy precursor by uniformly adding and distributing the graphite particles in the crucible. In this variation, the semi-solid cast part formed from such a process may include nominally 17 cm$^3$ of nickel-coated graphite and 65 cm$^3$ of C90500 copper alloy (about 21 volume % nickel-coated graphite and 79 volume % copper alloy).

In a third step, the admixture of a plurality of solid lubricant particles and a metal alloy material is reheated to melt the metal alloy material mixture. The furnace is turned back on and mixture is heated to greater than or equal to about 1,050° C. to less than or equal to about 1,100° C. Such a heating process may take greater than or equal to about 30 seconds to less than or equal to about 3 minutes, for example, about 1-2 minutes. At this temperature the copper alloy is in liquid phase, while the lubricant particles remain solid thus forming a semi-solid slurry. The furnace is then turned off.

In a fourth step, the admixture is stirred while cooling. The crucible is transferred from the furnace to a mechanical mixer. The mixing maintains a substantially homogeneous and even mixture of the graphite particles in the metal alloy material. The mixer may have a low speed single or double impellor, rotating at approximately about 200 to about 300 rpm in certain variations. The mixer is submerged into the admixture. The mixing may take place for approximately 30-90 seconds. The temperature is monitored with a thermocouple during this time, and the copper alloy transitions from fully liquid state to a viscous, semi-solid slurry admixture. Mixing continues until temperature cools to approximately greater than or equal to about 940° C. to less than or equal to about 970° C.

Vigorous mixing generates a well-mixed feedstock or precursor, and closely controlling the temperature of the admixture is important for producing a slurry that prevents the graphite from immediately floating to the surface, but also is not so viscous that it would fail to adequately flow during the injection process. Electromagnetic stirring does not appear to be vigorous enough to achieve adequate mixing; however, mechanical stirring provided good mixing. If not implemented differently, electromagnetic stirring may be adequate. Cooling of the alloy-graphite admixture during stirring below a temperature of approximately 940° C. is not successful, because the semi-solid slurry admixture became too viscous and therefore too difficult to transfer to the shot sleeve. FIGS. 19A-19B show an unetched microstructure of an admixture with the alloy and graphite prior to injecting into a mold.

In a fifth step, the mixture is injected into the mold. The mold cavity may have a preheat temperature of about 150° C. to about 250° C., optionally about 175° C. to about 225° C., for example, about 200° C. After mixing, the semi-solid slurry admixture is quickly transferred by its crucible to the casting machine, where the admixture is poured into a "shot sleeve" (a cylindrical chamber, like a barrel). The material is then immediately injected with a moving ram into a mold of predetermined shape made from tool steel. An electromagnetic copper alloy rheocaster system may be used for such a semi-solid processing. A final intensified nominal injection pressure may be greater than or equal to about 14,500 psi (about 100 MPa) to less than or equal to about 15,500 (about 107 MPa), for example, nominally about 15,000 psi (about 103 MPa).

FIGS. 19C-19D show an unetched microstructure of a machined cylindrical sleeve bearing after semi-solid metal casting in accordance with certain aspects of the present disclosure, including steps 1-5 described above. The microstructure has approximately 15% graphite and minimal voids. Due to the nature of the process, a maximum amount of 10% by volume of uniformly distributed, unlinked porosity may be present, having an average pore size comparable with the solid particle size.

Figure 2:
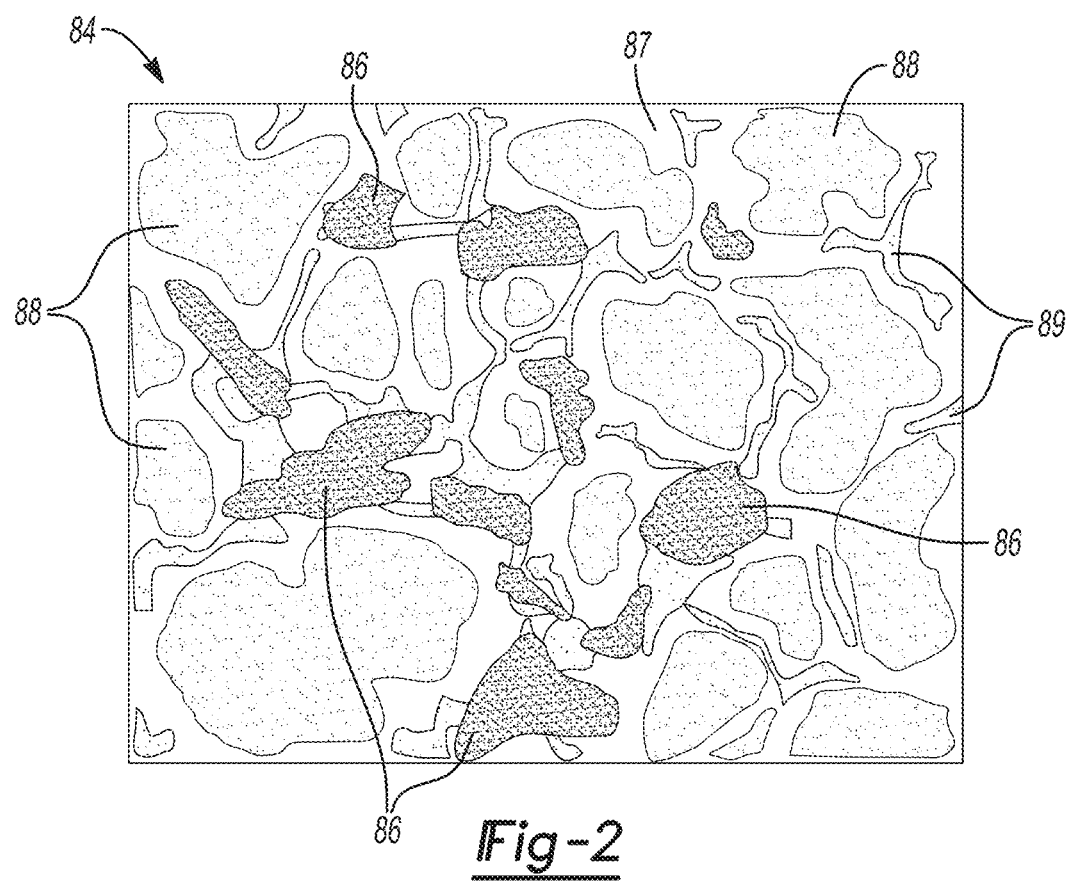
FIG. 2 is a schematic depiction of an exemplary microstructure of a tribological anti-wear composition in the form of a metal matrix composite comprising a plurality of solid lubricant particles dispersed in a metal matrix prepared by semi-solid metal casting in accordance with certain principles of the present disclosure.

FIG. 2 shows an exemplary microstructure of a tribological anti-wear composition in the form of a metal matrix composite 84 comprising a plurality of solid lubricant particles 86 dispersed in a metal matrix 87 prepared by semi-solid metal casting. The metal matrix composite 84 shown is intended to be representative of the general microstructure; however, the precise shape and size of the depicted phases may vary from those shown. The metal matrix 87 includes a primary phase 88 and regions 89 that are the last to solidify. As can be seen, the lubricant particles 86 are evenly (or substantially homogeneously) distributed through the metal matrix 87.

Figure 3:
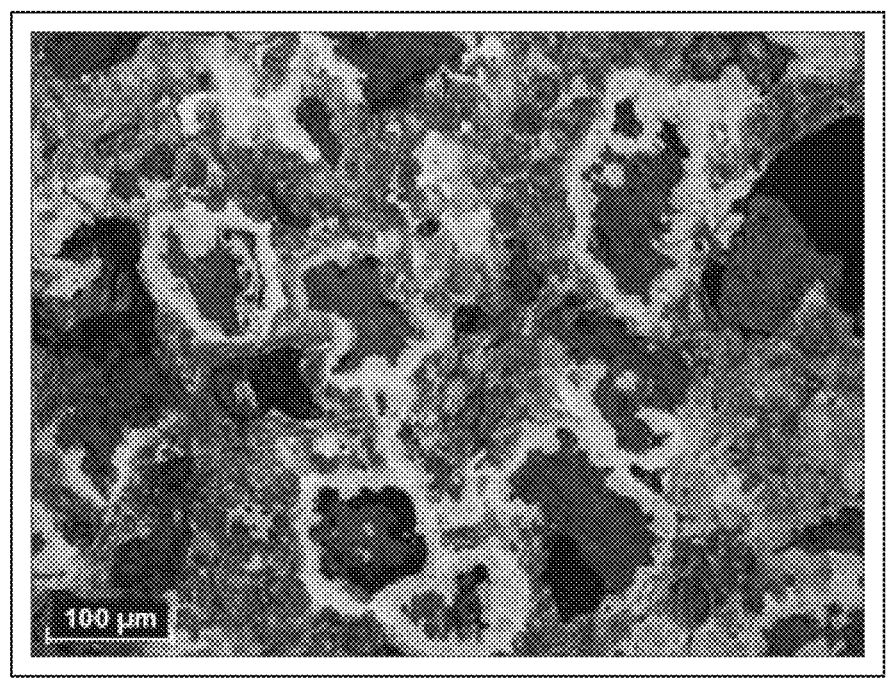
FIG. 3 is a magnified micrograph showing a microstructure of a representative metal matrix composite comprising a plurality of solid lubricant particles dispersed in a metal matrix prepared by semi-solid metal casting in accordance with certain principles of the present disclosure.

FIG. 3 is a magnified micrograph showing a microstructure of a representative metal matrix composite comprising a plurality of solid lubricant particles dispersed in a metal matrix prepared by semi-solid metal casting in accordance with certain principles of the present disclosure. More specifically, the solid lubricant particles are nickel-coated graphite particles distributed in a copper matrix (metallic alloy matrix) by a semi-solid casting process according to certain aspects of the present disclosure. Similar to the schematic in FIG. 2, the solid lubricant particles are distributed within a matrix material that includes the primary phase and also shows the last regions to solidify after semi-solid metal casting.

FIGS. 4A-4B are schematic sectional views of exemplary sleeve journal bearings having a tribological anti-wear composition in the form of a metal matrix composite comprising a plurality of solid lubricant particles dispersed in a metal matrix prepared by semi-solid metal casting in accordance with certain principles of the present disclosure. FIG. 4A shows a sleeve journal bearing 90 where the solid lubricant particles 92 are homogeneously distributed throughout the bulk of metal matrix material extending throughout the sleeve journal bearing 90, including along an exposed inner bearing wear surface 91, in accordance with certain aspects of the present disclosure. FIG. 4B shows a sleeve journal bearing 90B where an exposed inner bearing wear surface 91B has concentrated solid lubricant particles 92B that are homogeneously distributed throughout the metal matrix material in a surface layer 93 in accordance with certain other aspects of the present disclosure.

FIGS. 5A-5B are schematic sectional views of comparative sleeve journal bearings respectively that do not have adequate anti-wear properties on along an exposed inner bearing wear surface. In FIG. 5A, a sleeve journal bearing 94 has a plurality of solid lubricant particles 96 unacceptably concentrated in the center 97 of the bulk of metal matrix material, rather than along the exposed inner bearing surface 95 to provide adequate tribological properties. FIG. 5B shows a sleeve journal bearing 94B where a plurality of solid lubricant particles 96B are unacceptably highly concentrated on an external surface 97B of the sleeve journal bearing 94B, while having an unacceptably low concentration of solid lubricant particles along an exposed inner bearing wear surface 95B.

In certain aspects, the present disclosure contemplates a solid compressor component having a bearing wear surface. Such a compressor component may comprise a plurality of solid lubricant particles distributed within a matrix of a metal alloy material. The solid lubricant particles are present along at least one bearing wear surface of the solid component. In this manner, a bearing surface is formed of a tribological anti-wear composition comprising the plurality of solid lubricant particles dispersed in a metal matrix. In certain aspects, the solid lubricant particles may be present at greater than or equal to about 15 volume % to less than or equal to about 30 volume % of a total volume of the component, for example, at greater than or equal to about 17 volume % to less than or equal to about 25 volume %, optionally at greater than or equal to about 18 volume % to less than or equal to about 22 volume %, and optionally at about 20 volume %. As noted above, the metal alloy material has a first density and the plurality of solid lubricant particles has a second density, where the first density differs from the second density by at least about 25% or any other of the values discussed above. In other aspects, a ratio of the first density of the metal alloy to the second density of the solid lubricant particles is either less than or equal to about 0.5 or greater than or equal to about 1.5.

The compressor component comprising the metal matrix composite may have a porosity of less than or equal to about 10 volume %, optionally less than or equal to about 7 volume %, optionally less than or equal to about 5 volume %, optionally less than or equal to about 3 volume %, optionally less than or equal to about 2 volume %, and optionally less than or equal to about 1 volume %. In certain variations, it is desirable that the compressor component is non-porous, for example, having less than about 1% by volume porosity, optionally less than or equal to about 0.5% by volume porosity, and in certain aspects, optionally less than or equal to about 0.1% by volume porosity.

When pores are present in the metal matrix composite, it is advantageous that the pores are well distributed throughout the composite to minimize the effects of the porosity. It is advantageous that the pores formed are not linked or interconnected. Thus, it is desirable to obtain a substantially uniform distribution of graphite and pores throughout a cross-section of a metal matrix composite and/or along an internal region of a compressor component, which are identifiable at any magnification level as being uniformly distributed. In certain aspects, an average pore size diameter of the pores is the same as or similar to an average particle size diameter of the solid lubricant particles. For example, an average pore size diameter of the pores may be within 35% of an average particle size diameter of the solid lubricant particles, optionally within 30%, optionally within 25%, optionally within 20%, optionally within 15%, and in certain aspects, the average pore size diameter of the pores optionally may be within 10% of an average particle size diameter of the solid lubricant particles.

In certain aspects, a compressor component comprising the metal matrix composite may have greater than or equal to about 70 volume % metal alloy matrix, greater than or equal to about 20 volume % solid lubricant particles, and less than or equal to about 10 volume % porosity. In certain other aspects, a compressor component comprising the metal matrix composite may have greater than or equal to about 70 volume % copper alloy matrix, greater than or equal to about 20 volume % graphite particles, and less than or equal to about 10 volume % porosity.

In certain aspects, the solid compressor component is substantially lead-free. The present disclosure contemplates the following compressor components being formed in accordance with the present disclosure. It should be noted in preferred aspects, these components may be formed entirely in the solid-state metal casting (SSM) processes described above or in alternative aspects, certain portions of the component can be formed in the SSM process and then joined in an assembly with other components formed by other techniques, such as conventional casting, forging, or sintering processes, by way of non-limiting example.

The following detailed discussion pertains to the various wear surfaces in a scroll compressor on which the bearing surfaces of the present teachings may be present. Any variation or combination of the bearing surface embodiments described above is contemplated for use in conjunction with the scroll component wear surface. The metal matrix composite materials made by the inventive technology are particularly suitable for wear surfaces (in other words, surfaces that experience repeated frequent contact with nearby surfaces or parts and thus experience wear) in a scroll compressor, including various bearing surfaces and bearing components. In certain preferred aspects, the present teachings contemplate forming the entire component, including the bearing wear surface, from the materials described above. Thus, while the wear surfaces of the compressor components are specifically identified in the figures, it should be understood that the entire bulk of the compressor component may comprise the metal matrix composite material (having the solid lubricant particles evenly distributed in the metal alloy matrix) formed in accordance with the present disclosure.

In alternative aspects, the inventive wear or bearing surfaces may be a separate component that is assembled with other pieces formed via other manufacturing techniques to form the compressor component. These distinct portions may be attached via an interference fit, adhesives, mechanical couplings and the like. Such is the case for any of the embodiments discussed further herein. It is preferable that two wear surfaces that engage and contact one another are formed of distinct materials to reduce friction and improve tribological properties, so that only one surface is formed of a tribological anti-wear composition comprising a plurality of solid lubricant particles dispersed in a metal matrix alloy prepared according to the present disclosure.

FIG. 6 shows an exemplary self-lubricating sleeve journal bearing 100 for use in compressor machines, such as a scroll compressor. The sleeve bearing 100 has a tubular body 102 which may be formed from the processes and of the materials described above and a cylindrical opening 104 extending there through. The tubular body 102 further defines an internal bearing wear surface 106. The bearing wear surface 106 is exposed along the cylindrical opening 104. The cylindrical opening 104 can thus receive the crankshaft 32 or crank pin 34. In this manner, the bearing wear surface 106 interfaces with the rotating crankshaft 32 or crank pin 34 of crankshaft 32.

As noted above, in accordance with the present disclosure, this bearing wear surface 106 may have a plurality of solid lubricant particles dispersed within a metal matrix alloy to provide a tribological anti-wear composition 108. As described above in the context of FIGS. 4A-4B, the plurality of solid lubricant particles is preferably substantially homogeneously dispersed along the bearing wear surface 106 to enhance performance of the sleeve bearing 100. As shown in FIG. 6, in preferred aspects, the entire sleeve bearing 100 is formed from the metal matrix alloy, such as a copper alloy having solid graphite particles dispersed therein via the inventive SSM processes, which provides lead-free bearings having superior long term performance in a compressor.

However, it should be noted that in alternative variations, the sleeve bearing 100 may be an assembly of separate bearing parts, including a metal matrix alloy formed via the inventive SSM processes that will define an inner ring as a bearing wear surface 106, while the tubular body 102 may be a separate sleeve backing, which is often formed of steel in a tubular form (which may be formed by joining a steel sheet at a seam or by extruding or otherwise forming a tubular steel structure), as in conventional sleeve bearing designs.

As illustrated in FIGS. 7 and 8, a self-lubricating lower bearing 120 (like assembly 38 that shown in FIG. 1) includes a lower wear surface 122 (like lower wear surface 39 that shown in FIG. 1) having a cylindrical opening 124 extending there through. The cylindrical opening 124 receives a lower end of crankshaft 32. The lower bearing 120 includes a radially extending flange portion 126 having a plurality of mounting openings 128 therein that allow the bearing housing 130 to be mounted to a lower bearing support 132 (like the lower bearing support 26 in FIG. 1). The self-lubricating lower bearing 120 may be formed in accordance with the present disclosure, so that the lower wear surface 122 may have a plurality of solid lubricant particles dispersed within a metal matrix alloy to provide a tribological anti-wear composition 134.

In preferred aspects, such as those shown in FIGS. 7 and 8, the entire self-lubricating lower bearing 120 is formed from the metal matrix alloy composite, for example, a copper alloy having solid graphite particles dispersed therein via the inventive SSM processes. Where the entire self-lubricating lower bearing 120 is formed from the metal matrix alloy composite, all exposed surfaces of the self-lubricating lower bearing 120 have the tribological anti-wear composition comprising a plurality of solid lubricant particles dispersed within a metal matrix alloy. Such lead-free bearing components exhibit superior long term performance in a compressor. However, as described above in the context of the sleeve bearing 100 in FIG. 6, in alternative variations, the lower bearing 120 may be an assembly of separate bearing parts, including a metal matrix alloy formed via the inventive SSM processes to form the tribological anti-wear composition 134 as an inner ring seated in the cylindrical opening 124 to define the lower wear surface 122, while the bearing housing 130 and radially extending flange portion 126 may be formed via a distinct process and potentially from other materials.

FIG. 9 shows a drive bushing 150 like drive bushing 36 in FIG. 1. The drive bushing 150 is prepared in accordance with certain aspects of the present technology. The drive bushing has a flat drive surface 152 (for receiving the flat drive surface 62 of crank pin 34 to drive orbiting scroll 58 in FIG. 1). The drive bushing 150 can be seated within the cylindrical hub (61 of FIG. 1). An inner bore 154 can receive crank pin (34 of FIG. 1). Specific wear surfaces of the drive bushing 150 include the drive flat surface 152, an inner circumferential surface 160, and/or an outer circumferential surface 162 corresponding to an outer diameter of the drive bushing 150 that seats against the cylindrical hub. In FIG. 9, a tribological anti-wear composition 164 comprising a plurality of solid lubricant particles dispersed within a metal matrix alloy formed via the inventive SSM processes is disposed only on the drive flat surface 152 and outer circumferential surface 162 (but may be applied to other regions, such as the inner circumferential surface 160 within inner bore 154). As discussed above, these surfaces are subject to wear from being engaged with the upper bearing (upper bearing 35 in FIG. 1), or crank pin (crank pin 34 In FIG. 1) and therefore one or all of these surfaces may be formed of the tribological anti-wear composition 164. In embodiments where the drive bushing 150 is integrally formed of the metal matrix composite material, all exposed surfaces have the tribological anti-wear composition comprising a plurality of solid lubricant particles dispersed within a metal matrix alloy.

FIGS. 10A-10B show a main bearing housing 200 that includes a centrally disposed aperture 202 disposed therein to receive crankshaft (crankshaft 32 in FIG. 1). A plurality of arms or protrusions 210 connect and attach the main bearing housing 200 to the compressor shell (shell 12 in FIG. 1). The centrally disposed aperture 202 (which as shown has two distinct diameters, including a wider diameter upper region and a narrower diameter lower region). The narrower region of the centrally disposed aperture 202 receives and supports the crankshaft and thus defines an inner wear surface 212. Other wear surfaces on the main bearing housing 200 by way of non-limiting example include an annular thrust bearing surface 214 onto which orbiting scroll rests and orbits. A plurality of structural recesses 220 is formed in the plurality of arms or protrusions 222 that attach the main bearing housing 200 to the shell. These recesses 220 extend around a circumferential region 224 to define one or more Oldham coupling receiving surfaces 226 onto which an Oldham coupling can be seated and disposed, so that the Oldham coupling (68 in FIG. 1) may slide in these recesses 220 against receiving surfaces 226 when the scroll compressor is assembled and operated. As shown, the Oldham coupling receiving surfaces 226 are formed as a single annular region disposed about the outer circumference of the circumferential region 224.

Each of these bearing or wear surfaces, including inner wear surface 212, annular thrust bearing surface 214, and Oldham coupling receiving surfaces 226 may be formed of a tribological anti-wear composition 230 comprising a plurality of solid lubricant particles dispersed within a metal matrix alloy formed via the inventive SSM processes. It should be noted that the design may require only one of these wear surfaces to be formed of the tribological anti-wear composition 230. As noted above, in preferred aspects, the entire main bearing housing 200 may be integrally formed as a single part formed entirely of the metal composite tribological anti-wear composition 230, in which case all exposed surfaces have the tribological anti-wear composition comprising a plurality of solid lubricant particles dispersed within a metal matrix alloy.

An Oldham coupling 250 is shown in FIGS. 11A and 11B, (assembled into the scroll compressor 10 in FIG. 1). A first side 252 is shown in FIG. 11A, while an opposite second side 254 of the Oldham coupling 250 is shown in FIG. 11B. As discussed above, the Oldham coupling 250 is keyed to orbiting scroll (58 in FIG. 1) and to non-orbiting scroll (70 in FIG. 1) to prevent rotational movement of orbiting scroll as it is driven by crankshaft.

A plurality of Oldham keys 256 is provided on Oldham coupling ring 258. A first pair of keys 260 is in a generally diametrically aligned relationship and each projects upward from a surface 262 of Oldham coupling ring 258. A second pair of keys 264 is likewise aligned diametrically apart on the Oldham coupling ring 258 and also projects upward from surface 262. The second pair of keys 264 generally extends farther upwards, so that the second pair of keys is capable of engaging with a non-orbiting scroll. The first pair of keys 260 is shorter and thus is capable of engaging with the orbiting scroll. Oldham coupling 250 is guided in its translational movement by non-orbiting scroll keys 264 while being driven by orbiting scroll keys 260.

Thus, a first plurality of Oldham coupling wear surfaces 266 is formed on the contact regions at the terminal end of each Oldham key 256 (whether in the first pair of keys 260 or second pair of keys 264). A second plurality of Oldham coupling wear surfaces 272 is raised and forms discrete contact regions along the first side 252 of the Oldham coupling ring 258 in a region near or adjacent to the Oldham keys 256. A third plurality of Oldham coupling wear surfaces 274 are formed at the terminal end of each Oldham pad along the second side 254 of Oldham coupling ring 258 where contact occurs. Generally, vertical motion of Oldham coupling 250 is limited by contact of a plurality of Oldham pads corresponding to the third Oldham coupling wear surfaces 274 disposed on the second side 254 of Oldham coupling ring 258. As Oldham coupling 250 is driven, inertial and frictional forces tend to cause the plurality of Oldham pads to contact the one or more Oldham coupling receiving surfaces 226 of the main bearing housing 200.

Thus, wear surfaces in the Oldham coupling 250 are those are subject to wear from being engaged with various other surfaces within the compressor, for example, surfaces that interact with the orbiting scroll, the non-orbiting scroll, or main bearing housing. These wear surfaces include the first plurality of Oldham coupling wear surfaces 266, the second plurality of Oldham coupling wear surfaces 272, and the third plurality of Oldham coupling wear surfaces 274 on the Oldham coupling 250 can be selectively formed of a tribological anti-wear composition 270 comprising a plurality of solid lubricant particles dispersed within a metal matrix alloy formed via the inventive SSM processes. As noted above, in preferred aspects, the entire Oldham coupling 250 may be integrally formed as a single part and formed entirely of the metal composite tribological anti-wear composition 230; therefore all exposed surfaces have the tribological anti-wear composition 230 comprising a plurality of solid lubricant particles dispersed within a metal matrix alloy. Alternatively, certain designs may require only one of these wear surfaces to be formed of the tribological anti-wear composition 230.

The orbiting and non-orbiting scrolls of a scroll compressor also define multiple wear or bearing surfaces. As shown in FIGS. 12A and 12B, an orbiting scroll 300 has a baseplate 302 having a pair of outwardly projecting flange portions 304 each of which is provided with an outwardly opening slot 306. Slots 306 are sized to slidingly receive the first pair of Oldham keys 260. Orbiting scroll 300 also has an involute vane 312 extending from baseplate 302. Likewise, as shown in FIG. 13, a fixed non-orbiting scroll 350 has a baseplate 352 with a pair of outwardly projecting flange portions 354, each of which is provided with an outwardly opening slot 356. Slots 356 are sized to slidingly receive the second pair of Oldham keys 264 in FIG. 11A.

As best seen in FIG. 12B, a cylindrical hub 308 of orbiting scroll 300 defines an inner circumferential wear surface 310 capable of receiving rotating crankshaft (or further receiving a bushing and an upper bearing as described previously above that receive the crankshaft). The inner circumferential wear surface 310 of cylindrical hub 308 may house a drive bushing (36 in FIG. 1 or 150 in FIG. 9) that defines a drive flat surface into which a flat drive surface of the crank pin is drivingly disposed. In FIG. 12B, the hub's 308 inner circumferential wear surface 310 may thus encounter friction in the inner diameter of cylindrical hub 308.

Other wear surfaces include an annular thrust bearing surface 314 where the orbiting scroll 300 sits on the main bearing housing and contacts as it orbits, by way of non-limiting example. Various wear surfaces on the orbiting scroll 300 include the inner circumferential wear surface 310 of the cylindrical hub 308, internal surfaces of slots 306, and an annular thrust bearing surface 314, by way of non-limiting example. Such wear surfaces may thus have a tribological anti-wear composition 318 comprising a plurality of solid lubricant particles dispersed within a metal matrix alloy formed via the inventive SSM processes. While not shown, the involute vane 312 may also be a wear surface formed of the tribological metal matrix composite. Preferably, the orbiting scroll 300 is formed entirely of the metal composite tribological anti-wear composition 318, in which case all exposed surfaces have the tribological anti-wear composition comprising a plurality of solid lubricant particles dispersed within a metal matrix alloy.

With renewed reference to FIG. 13, various wear surfaces are formed on the non-orbiting scroll 350. As discussed above, the baseplate 352 comprises a protrusion or projecting flange portion 354 defining a slot 356 that slidingly receives the second pair of Oldham keys 264 (FIG. 11A) and thus a wear surface is formed on the interior surface 358 of the slot 356. Other portions of the baseplate 352 that contact other components (like portions of the partition or muffler cap 22, floating seal assembly 71, or other adjacent scroll components as shown in FIG. 1) define wear surfaces that may have the desired material composition, as well. The non-orbiting scroll 350 has an involute vane 362 that interfaces with an orbiting scroll involute vane (312 in FIG. 12A). Hence, one or more wear surfaces on the non-orbiting scroll component 350, such as the one or more surface regions corresponding to the interior surfaces 358 of slots 356 can include a tribological anti-wear composition 360 comprising a plurality of solid lubricant particles dispersed within a metal matrix alloy formed via the inventive SSM processes. While not shown, the involute vane 362 may also be a wear surface formed of the metal matrix composite. As with the prior embodiments, the present disclosure contemplates that non-orbiting scroll component 350 is integrally formed entirely of the metal composite tribological anti-wear composition, in which case all exposed surfaces have the tribological anti-wear composition comprising a plurality of solid lubricant particles dispersed within a metal matrix alloy.

With reference to FIG. 14, an alternative design of a lower bearing assembly 400 is shown that includes a bearing plate 402 that defines axially-extending legs 404 on opposite ends thereof. The bearing plate 402 is configured to extend across the interior of shell of the compressor with legs 404 engaged with and welded to the interior surface of shell to hold bearing plate 402 in position. A lower hub 410 is centrally disposed within bearing plate 402, and includes an opening 412 through which crankshaft extends. Lower hub 410 has an upwardly projecting portion 414 and a lower projecting portion 416 that has a generally circular periphery. The upwardly projecting portion 414 defines an annular lower thrust bearing surface region 418, which is a wear surface that potentially contacts the crankshaft. Lower hub 410 is rotationally and axially fixed to bearing plate 402 with a plurality of fasteners 420. An internal circumferential surface of lower hub 410 likewise defines a lower journal wear surface 422 that rotatably supports crankshaft. Each of the wear surfaces on the lower bearing assembly 400, such as the annular lower thrust bearing surface region 418 or the lower journal wear surface 422 can be designed to have a tribological anti-wear composition 430 comprising a plurality of solid lubricant particles dispersed within a metal matrix alloy formed via the inventive SSM processes. As with the prior embodiments, the present disclosure contemplates that the lower bearing assembly 400 is integrally formed entirely of the metal composite tribological anti-wear composition 430, in which all exposed surfaces have the tribological anti-wear composition 430 comprising a plurality of solid lubricant particles dispersed within a metal matrix alloy including the predetermined wear or bearing surfaces.

In yet another alternative embodiment of a lower bearing assembly 450, as shown in FIG. 15, a support structure 452 defines four orthogonally-oriented legs 454 and a ring 456. The support structure 452 is configured so that legs 454 extend across the interior of shell and engage with and are fastened to the interior surface of shell to hold the support structure 452 in position. A central region 460 of the support structure 452 is formed where legs 454 intersect and includes a centrally disposed opening 462 through which the crankshaft may extend. A recessed annular lower thrust bearing wear surface region 464 is formed around centrally disposed opening 462 and thus is a wear surface that potentially contacts the crankshaft during compressor operation. The centrally disposed opening 462 further defines an integrated circumferential surface that defines an upper wear surface region 465 that rotatably supports crankshaft.

Each of the wear surfaces on the lower bearing assembly 450, such as the recessed annular wear surface region 464 or the upper wear surface region 465 can be selectively formed of a tribological anti-wear composition 466 comprising a plurality of solid lubricant particles dispersed within a metal matrix alloy formed via the inventive SSM. It should be noted that the design may be such that only one of the annular lower thrust bearing surface region 464 or upper wear surface region 465 may be formed of the tribological anti-wear composition 466. As with the prior embodiments, the present disclosure contemplates that the lower bearing assembly 450 is integrally formed entirely of the metal composite tribological anti-wear composition 466, in which case all exposed surfaces have the tribological anti-wear composition 466 comprising a plurality of solid lubricant particles dispersed within a metal matrix alloy, including the predetermined wear or bearing surfaces.

In accordance with certain aspects of the present teachings, as shown in FIG. 16, an annular upper seal plate 470 has a base plate 476 which forms part of a floating seal assembly (like floating seal 71 in FIG. 1). A floating annular seal 478 may be disposed within regions of the upper seal plate 470 or may be integrally formed with it. Upper seal plate 470 includes an upwardly projecting sealing lip or annular rim 474 that extends from upper seal plate 470 that engages an insert fitted into an opening in partition or muffler cap 22 (FIG. 1) to separate the discharge area of scroll compressor.

An annular upper seal plate wear surface 472 is defined on a terminal face of the projecting sealing annular rim 474 on the upper seal plate 470. The annular upper seal plate wear surface 472 contacts an opposing surface when assembled in a scroll compressor. A terminal face of the projecting sealing annular rim 474 on the upper seal plate 470 may be formed of a tribological anti-wear composition 480 comprising a plurality of solid lubricant particles dispersed within a metal matrix alloy formed via the inventive SSM processes. As with the prior embodiments, the present disclosure contemplates that the upper seal plate 470 may be integrally formed entirely of the metal composite tribological anti-wear composition 466, in which case all exposed surfaces have the tribological anti-wear composition 466, including the predetermined wear or bearing surfaces.

A muffler plate or cap 490 (like muffler cap 22 in FIG. 1) is shown in FIG. 17. The muffler cap 490 includes a peripheral region 492 that attaches the muffler cap 490 about its periphery to the compressor housing or shell (not shown in FIG. 17). The muffler cap 490 also has a central aperture 494 that cooperates with other components (e.g., an annular hub or raised shoulder portion 77 of non-orbiting scroll 70 and floating seal assembly 71 in FIG. 1) in the compressor to form a discharge chamber. The muffler cap 490 also has an annular ring 496 surrounding the central aperture 504. The annular ring 496 serves as a bearing surface that interacts with an opposing raised shoulder or hub on a non-orbiting scroll as pressure changes occur during compressor operation. The annular ring 496 may be formed of a tribological anti-wear composition 498 comprising a plurality of solid lubricant particles dispersed within a metal matrix alloy formed via the inventive SSM processes. As with the prior embodiments, the present disclosure contemplates that the muffler cap 490 may be integrally formed entirely of the tribological anti-wear composition 498, in which case all exposed surfaces including the bearing surface(s) have the tribological anti-wear composition 498 comprising a plurality of solid lubricant particles dispersed within a metal matrix alloy.

In yet another embodiment shown in FIG. 18A, a horizontal open-drive scroll compressor is shown, although the present teachings are applicable for incorporation into various types of scroll and rotary compressors. For exemplary purposes, open drive compressor 510 is shown as a horizontal scroll compressor, which is described in U.S. Pat. No. 8,747,088 to Elson et al., which is herein incorporated by reference. It is noted that compressor 510 has similar operating principles to scroll compressor 10 in FIG. 1, but has an open-drive configuration employing a bellows-type shaft seal assembly 556 that will be discussed herein.

Compressor 510 may include a compressor housing assembly 512, a main bearing housing assembly 514, a drive shaft assembly 516, a compression mechanism 518, a retaining assembly 520, a seal assembly 522, a discharge valve assembly 524, an oil separator 526, and an oil feed mechanism 528. Housing assembly 512 may include a cylindrical hermetic shell 530, an end cap 532, a transversely extending partition 534, a base assembly 536, a suction gas inlet fitting 538, and a refrigerant discharge fitting 540.

Cylindrical hermetic shell 530 may include an opening 542 having suction gas inlet fitting 538 attached thereto. End cap 532 and transversely extending partition 534 may generally define a discharge chamber 544. More specifically, transversely extending partition 534 may be fixed to a first end of shell 530 and end cap 532 may be fixed to transversely extending partition 534. End cap 532 may include an opening 546 having refrigerant discharge fitting 540 fixed thereto. Partition 534 may include an opening 548 to provide fluid communication between compression mechanism 518 and discharge chamber 544. Discharge chamber 544 may generally form a discharge muffler for compressor 510. Base assembly 536 may be fixed to shell 530 at an end generally opposite partition 534.

Main bearing housing assembly 514 may include a main bearing housing 568. Main bearing housing 568 may be press fitted into shell 530. Drive shaft assembly 516 may include a drive shaft 586, a first counterweight 588 and a second counterweight 590. Drive shaft 586 may include first and second ends 592, 594 and first and second journal portions 596, 598 disposed there between. First end 592 may include an eccentric crank pin 600 having a flat 602 thereon. Second end 594 may extend axially past base assembly 536 and may be disposed external to housing assembly 512, thus forming the open-drive compressor configuration. A drive mechanism (not shown) may engage second end 594 to power rotation of drive shaft 586. First and second journal portions 596, 598 may be rotatably disposed within bearing 576 and bearing assembly 552, respectively.

The compressor 510 includes an orbiting scroll 604 and a non-orbiting scroll 606. Orbiting scroll 604 has a baseplate 608 with a spiral wrap or vane 610 on a first side. On an opposite side, the baseplate 608 of orbiting scroll 604 has a thrust surface 612 and a cylindrical hub 614 that receives the eccentric crank pin 600 and an upper bearing 616.

Non-orbiting scroll 606 has a baseplate 618 with a spiral wrap or vane 620 positioned in meshing engagement with the orbiting spiral vane 610 of orbiting scroll 604. Non-orbiting scroll 606 has a centrally disposed discharge passage 638 in fluid communication with discharge chamber 544. Non-orbiting scroll 606 also includes an annular hub or raised shoulder portion 640 which surrounds the discharge passage 638. The discharge valve assembly 524 is seated within the annular hub or raised shoulder portion 640 of the non-orbiting scroll 606.

Base assembly 536 may include a base member 550, a bearing assembly 552, a seal housing 554, and a seal assembly 556. Base member 550 may include a central opening 558 including first and second portions 560, 562 and a radially inwardly extending protrusion 564 disposed there between. Bearing assembly 552 may be located in first portion 560 of opening 558 and may include a ball bearing assembly. Seal housing 554 may be located in second portion 562 of opening 558 and may be fixed to base member 550.

Seal assembly 556 may be located within seal housing 554 and may include a shaft seal 566, as shown in FIGS. 18A-18B. The shaft seal 566 in certain variations is a bellows-type seal defining a central opening 642 for receiving shaft 586 and having a first end 644 and a second end 646. More specifically, the shaft seal 566 defines a collar 652 at second end 646 and a bellows region 654 that is compliant at first end 644. The collar 652 thus receives and can be coupled to the drive shaft 586. The first end 644 further defines a face seal contact or wear surface 648 that seats against and interacts with a counterpart wear surface 650 of seal housing 554. The counterpart wear surface 650 is typically a distinct stationary mating ring seated within a recess of the seal housing 554.

Shaft seal 566 may be sealingly engaged with drive shaft 586 at a location between second end 594 and second journal portion 598 to prevent leakage of oil from housing assembly 512. Thus, the first end 644 of shaft seal 566 typically rotates with the drive shaft 586 against the stationary counterpart wear surface 650 and thus prevents leakage of oil and refrigerant out of the open-drive compressor. First counterweight 588 may be fixed to drive shaft 586 at a location between first end 592 and first journal portion 596 and second counterweight 590 may be fixed to drive shaft 586 at a location between first journal portion 596 and second journal portion 598.

As noted above, the first end 644 of shaft seal 566 defines a face seal contact or wear surface 648 that interacts with the counterpart wear surface 650 of seal housing 554. The counterpart wear surface 650, which may be in the form of a distinct mating ring, can be formed of tungsten carbide, silicon carbide, graphitized silicon carbide, silicon carbide, or any combination thereof.

In accordance with certain aspects of the present disclosure, the face seal wear surface 648 of the shaft seal 566 may be formed of a tribological anti-wear composition 660 comprising a plurality of solid lubricant particles dispersed within a metal matrix alloy formed via the inventive SSM processes. As with the prior embodiments, the present disclosure contemplates that the shaft seal 566, including face seal wear surface 648, may be integrally formed, in which case all exposed surfaces including the predetermined wear or bearing surfaces have the tribological anti-wear composition 660 comprising a plurality of solid lubricant particles dispersed within a metal matrix alloy. Thus, the entire bellows shaft seal 566 may be formed of the tribological anti-wear composition 660 having the solid lubricant particles distributed there through. In alternative aspects, the wear surface 648 may be formed of a tribological anti-wear composition 660, while the collar 652 and bellows region 654 of the shaft seal 566 may be formed from a variety of distinct materials from conventional materials that will reliably form a seal.

In accordance with certain aspects of the present disclosure, it is desirable to provide a self-lubricating bearing material that is stable upon exposure to refrigerant throughout compressor operating conditions. Hermetic compressors, in particular, require bearing materials having long service life and superior long-term wear resistance, as such materials generally cannot be replaced via maintenance. Accordingly, in various aspects, the present disclosure provides a compressor component having a bearing wear surface (along one or more wear surfaces or portions of the compressor that contact other components in the compressor) comprising a plurality of solid lubricant particles evenly distributed within a matrix of a metal alloy material that serves as a tribological anti-wear composition. The solid lubricant particles are present along at least one bearing wear surface of the solid component at greater than or equal to about 10 volume % to less than or equal to about 30 volume % of a total volume of the semi-solid admixture. A metal matrix composite having such solid lubricant particles further may have less than or equal to about 10% by volume porosity The metal alloy material has a first density and the plurality of solid lubricant particles has a second density. In certain aspects, a ratio of the first density to the second density is less than or equal to about 0.5 or alternatively greater than or equal to about 1.5. In other aspects, the first density differs from the second density by at least about 25%. In certain aspects, the solid compressor component is lead-free and incorporates lead free solid lubricant particles.

The solid compressor component may be selected from the group consisting of: a cylindrical sleeve bearing, a face seal, a drive flat on a crankshaft, a main journal bearing, a lower journal bearing, a slider block, a drive flat on a bushing, an outer diameter of a bushing, an Oldham coupling, an upper seal plate of a seal assembly, a thrust plate, an orbiting scroll, a non-orbiting scroll, a thrust bearing surface on a main bearing housing, a lower bearing plate assembly, an Oldham sliding area on a main bearing housing, a muffler plate or partition, bellows shaft seal, and combinations thereof.

Scroll compressors incorporating such components with the inventive metal composite tribological materials formed via semi-solid metal casting are robust, have very good lubricity, are lead-free and more environmentally-friendly, and can have tighter tolerances and thus improved anti-wear performance.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A compressor component comprising:
a cast solid comprising a bulk region formed of a metal alloy material comprising a copper alloy and at least one bearing wear surface comprising a plurality of solid lubricant particles homogeneously distributed within a matrix of the metal alloy material, the cast solid having less than or equal to about 1% by volume porosity, wherein the plurality of solid lubricant particles is selected from the group consisting of: nickel-coated graphite particles, copper-coated graphite particles, zinc-coated graphite particles, uncoated graphite particles, and combinations thereof and is present along the at least one bearing wear surface at greater than or equal to about 10 volume % to less than or equal to about 30 volume % of a total combined volume of the plurality of the solid lubricant particles and the matrix, wherein the compressor component is substantially lead-free.

2. The compressor component of claim 1, wherein the metal alloy material has a first density and the plurality of solid lubricant particles has a second density, wherein a difference between the first density and the second density is greater than or equal to about 25%.

3. The compressor component of claim 1, wherein the compressor component is selected from the group consisting of: a cylindrical sleeve bearing, a face seal, a drive flat on a crankshaft, a main journal bearing, a lower journal bearing, a slider block, a drive flat on a bushing, an outer diameter of a bushing, an Oldham coupling, an upper seal plate of a seal assembly, a thrust plate, an orbiting scroll, a non-orbiting scroll, a thrust bearing surface on a main bearing housing, a lower bearing plate assembly, an Oldham sliding area on a main bearing housing, a muffler plate or partition, bellows shaft seal, and combinations thereof.

4. The compressor component of claim 1, wherein the plurality of solid lubricant particles comprises nickel-coated graphite particles.

5. The compressor component of claim 1, wherein the plurality of solid lubricant particles is homogeneously distributed throughout the entire compressor component, including in the at least one bearing surface and the bulk region.

6. The compressor component of claim 1, wherein the plurality of solid lubricant particles is homogeneously distributed throughout the at least one bearing wear surface, but not throughout the entire compressor component.

7. A method of making a bearing wear surface for a compressor component, the method comprising:
heating an admixture of a plurality of solid lubricant particles and a metal alloy material to melt the metal alloy material, wherein the molten metal alloy material has a first density and the plurality of solid lubricant particles have a second density, wherein a difference between the first density and the second density is greater than or equal to about 25% and the metal alloy material comprises a copper alloy and the plurality of solid lubricant particles is selected from the group consisting of: nickel-coated graphite particles, copper-coated graphite particles, zinc-coated graphite particles, uncoated graphite particles, and combinations thereof,
mixing and cooling the admixture, so that the molten metal alloy material cools to form a semi-solid slurry admixture;
introducing the semi-solid admixture into a die; and
solidifying the semi-solid slurry admixture to form a cast solid component comprising a bulk region formed of a metal alloy material comprising a copper alloy and at least one bearing wear surface having the plurality of the solid lubricant particles homogeneously distributed within a matrix of the metal alloy material, the cast solid having less than or equal to about 1% by volume porosity,
wherein the plurality of the solid lubricant particles is present along at least one bearing wear surface of the solid component at greater than or equal to about 10 volume % to less than or equal to about 30 volume % of a total combined volume of the plurality of the solid lubricant particles and the matrix, wherein the compressor component is substantially lead-free.

8. The method of claim 7, wherein the plurality of solid lubricant particles comprises nickel-coated graphite particles.

9. The method of claim 7, wherein the plurality of solid lubricant particles has an average particle size distribution of greater than or equal to about 90 weight % of the solid lubricant particles passing on a −170 mesh and being retained on a +325 mesh.

10. The method of claim 7, wherein the plurality of solid lubricant particles is present in the semi-solid slurry admixture at greater than or equal to about 10 volume % to less than or equal to about 30 volume % of a total volume of the semi-solid slurry admixture.

11. The method of claim 7, wherein the semi-solid slurry admixture after the mixing and cooling has greater than or equal to about 30 volume % solids to less than or equal to about 65 volume % solids.

12. The method of claim 7, wherein the copper alloy material comprises:
tin present at greater than or equal to 0 weight % to less than or equal to about 10 weight % of the copper alloy material;
bismuth at greater than or equal to 0 weight % to less than or equal to about 6 weight % of the copper alloy material;
nickel at greater than or equal to 0 weight % to less than or equal to about 5 weight % of the copper alloy material;
aluminum at greater than or equal to 0 weight % to less than or equal to about 15 weight % of the copper alloy material;
iron greater than or equal to 0 weight % to less than or equal to about 10 weight % of the copper alloy material;
zinc greater than or equal to 0 weight % to less than or equal to about 20 weight % of the copper alloy material;
a remainder of other minor elements at less than or equal to about weight 2% of the copper alloy material; and
a balance of the copper alloy material being copper.

13. The method of claim 7, wherein prior to the heating, first dividing a solid ingot of the metal alloy material into a plurality of pieces and preheating the plurality of pieces to form a semi-solid metal alloy material and introducing the plurality of solid lubricant particles into the semi-solid metal alloy material to form the admixture.

14. The method of claim 7, wherein the plurality of solid lubricant particles comprises nickel-coated graphite particles and before the heating of the admixture, the method further comprises preheating the nickel-coated graphite particles to a temperature of less than or equal to about 400° C. followed by introducing the plurality of solid lubricant particles into a semi-solid metal alloy material to form the admixture.

15. The method of claim 7, wherein the metal alloy material is a copper alloy material and the method further comprises before the heating the admixture:
preheating the metal alloy material to a temperature of greater than or equal to about 970° C. to less than or equal to about 990° C. for greater than or equal to about 30 seconds to less than or equal to about 3 minutes, and introducing the plurality of solid lubricant particles into the preheated metal alloy material to form the admixture.

16. The method of claim 7, wherein the metal alloy material is a copper alloy material and the admixture is heated to a temperature of greater than or equal to about 1,050° C. to less than or equal to about 1,100° C. for greater than or equal to about 30 seconds to less than or equal to about 3 minutes so that the copper alloy is in a liquid state.

17. The method of claim 7, wherein the metal alloy material is a copper alloy material and the mixing and cooling is conducted by removing the admixture from a heat source and mixing the admixture at a speed of greater than or equal to about 200 revolutions per minute (rpm) to less than or equal to about 300 rpm for greater than or equal to about 30 seconds to less than or equal to about 90 seconds so that semi-solid admixture is cooled to a temperature of greater than or equal to about 940° C. to less than or equal to about 970° C.

18. The method of claim 7, wherein the introducing the semi-solid slurry admixture into the die further comprises injecting the semi-solid slurry admixture with a moving ram into a die defining a cavity with a predetermined shape.

19. The method of claim 18, wherein a final nominal pressure during the injecting is greater than or equal to about 14,500 psi (about 100 MPa) to less than or equal to about 15,500 (about 107 MPa).

20. The method of claim 18, wherein the cavity of the die is preheated before the injecting to a temperature of greater than or equal to about 150° C. to less than or equal to about 250° C.

* * * * *